(12) United States Patent
Tashiro

(10) Patent No.: US 9,294,692 B2
(45) Date of Patent: Mar. 22, 2016

(54) IMAGE PICKUP APPARATUS HAVING PHOTOELECTRIC COVERSION UNITS, METHOD OF DRIVING IMAGE PICKUP APPARATUS, AND METHOD OF DRIVING IMAGE PICKUP SYSTEM

(71) Applicant: CANON KABUSHIKI KAISHA, Tokyo (JP)

(72) Inventor: Kazuaki Tashiro, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 13/939,719

(22) Filed: Jul. 11, 2013

(65) Prior Publication Data

US 2014/0016009 A1  Jan. 16, 2014

(30) Foreign Application Priority Data

Jul. 13, 2012 (JP) .................................. 2012-157551

(51) Int. Cl.
| | |
|---|---|
| *H04N 5/335* | (2011.01) |
| *H04N 5/347* | (2011.01) |
| *H04N 5/345* | (2011.01) |
| *H04N 5/3745* | (2011.01) |
| *H04N 9/04* | (2006.01) |
| *H04N 5/355* | (2011.01) |

(52) U.S. Cl.
CPC ............. *H04N 5/335* (2013.01); *H04N 5/347* (2013.01); *H04N 5/3458* (2013.01); *H04N 5/35545* (2013.01); *H04N 5/37457* (2013.01); *H04N 9/045* (2013.01)

(58) Field of Classification Search
CPC ....................... H04N 5/35536; H04N 5/35545
See application file for complete search history.

(56) References Cited

U.S. PATENT DOCUMENTS

| | | | |
|---|---|---|---|
| 6,452,153 B1 * | 9/2002 | Lauxtermann et al. .... | 250/208.1 |
| 8,130,302 B2 * | 3/2012 | Johnson ........................ | 348/308 |
| 8,451,354 B2 * | 5/2013 | Cazaux et al. ................ | 348/295 |
| 8,817,150 B2 * | 8/2014 | Giffard et al. ................ | 348/308 |
| 2004/0262492 A1 * | 12/2004 | Matsuda et al. ........... | 250/208.1 |
| 2009/0032852 A1 * | 2/2009 | Song et al. .................... | 257/292 |
| 2009/0295971 A1 | 12/2009 | Tsuchiya | |
| 2010/0133590 A1 | 6/2010 | Mheen | |
| 2011/0194007 A1 * | 8/2011 | Kim et al. ...................... | 348/308 |
| 2012/0133813 A1 * | 5/2012 | Nagano ......................... | 348/311 |

FOREIGN PATENT DOCUMENTS

| | | |
|---|---|---|
| JP | 2006-041866 A | 2/2006 |
| JP | 2006-270658 A | 10/2006 |
| JP | 2009-290659 A | 12/2009 |

* cited by examiner

*Primary Examiner* — Albert Cutler

(74) *Attorney, Agent, or Firm* — Canon USA, Inc. IP Division

(57) ABSTRACT

One exemplary embodiment is a method of driving an image pickup apparatus including a plurality of photoelectric conversion units. A driving method of the present exemplary embodiment includes a generating step of generating electric charges in the photoelectric conversion unit during a period from a first time to a second time; and a transferring step of transferring electric charges generated in the generating step of generating into at least two electric charge reception units in parallel. Then, electric charges transferred from different photoelectric conversion units are added in at least one electric charge reception unit.

22 Claims, 15 Drawing Sheets

FIG. 7A (Bayer pattern sensor array with columns 1-16 and rows A-L, showing R/Gr/Gb/B pattern with reference numerals 301-308, 313-316 at top and 309-312, 317-324 at bottom)

FIG. 7B (Same sensor array showing sparse sampling pattern with reference numerals 301-308, 313-316 at top and 309-312, 317-324 at bottom)

FIG. 8A

|   | 1 | 2 | 3 | 4 | 5 | 6 | 7 | 8 |
|---|---|---|---|---|---|---|---|---|
| A | R | Gr | R | Gr | R | Gr | R | Gr |
| B | Gb | B | Gb | B | Gb | B | Gb | B |
| C | R | Gr | R | Gr | R | Gr | R | Gr |
| D | Gb | B | Gb | B | Gb | B | Gb | B |
| E | R | Gr | R | Gr | R | Gr | R | Gr |
| F | Gb | B | Gb | B | Gb | B | Gb | B |
| G | R | Gr | R | Gr | R | Gr | R | Gr |
| H | Gb | B | Gb | B | Gb | B | Gb | B |

|   | 1 | 2 | 3 | 4 | 5 | 6 | 7 | 8 |
|---|---|---|---|---|---|---|---|---|
| A |   |   |   |   |   |   |   |   |
| B |   | R | Gr | R | Gr | R | Gr | R |
| C |   | Gb | B | Gb | B | Gb | B | Gb |
| D |   | R | Gr | R | Gr | R | Gr | R |
| E |   | Gb | B | Gb | B | Gb | B | Gb |
| F |   | R | Gr | R | Gr | R | Gr | R |
| G |   | Gb | B | Gb | B | Gb | B | Gb |
| H |   | R | Gr | R | Gr | R | Gr | R |

IMAGE PICKUP APPARATUS HAVING PHOTOELECTRIC COVERSION UNITS, METHOD OF DRIVING IMAGE PICKUP APPARATUS, AND METHOD OF DRIVING IMAGE PICKUP SYSTEM

BACKGROUND OF THE INVENTION

1. Field of the Invention

The present disclosure relates to a method of driving an image pickup apparatus.

2. Description of the Related Art

In an image pickup apparatus proposed in Japanese Patent Application Laid-Open No. 2006-270658, two output circuits are arranged by being shifted by a pitch of arrangement of one photodiode in a row direction and in a column direction. Further, the output circuits respectively mix signal electric charges of four photodiodes around the respective output circuits. With such a configuration, an optical low-pass filter is not required.

Further, in an image pickup apparatus disclosed in US Patent Application Publication No. 2010/0133590, four transfer transistors are connected to a shared photodiode, and an electric charge of one photoelectric conversion unit is simultaneously transferred to four diffusion regions. Further, FIG. 6 of US Patent Application Publication No. 2010/0133590 discloses that the image quality is improved although the pixel size is increased and the resolution is decreased, by adding, in an information processing block, values obtained from adjacent pixels.

SUMMARY OF THE INVENTION

An exemplary embodiment according to one aspect of the present invention is a method of driving an image pickup apparatus including a plurality of photoelectric conversion units. The method of the embodiment includes a generating step of generating electric charges in the photoelectric conversion unit during a period from a first time to a second time; and a transferring step of transferring electric charges generated in the generating step into a plurality of electric charge reception units in parallel. Electric charges transferred from different photoelectric conversion units in the transferring step are added in at least one of the plurality of electric charge reception units, by performing the transferring step for each of the plurality of photoelectric conversion units.

An exemplary embodiment according to another aspect of the present invention is a method of driving an image pickup apparatus including a plurality of photoelectric conversion units. The method of the embodiment includes a generating step of generating electric charges in the photoelectric conversion unit during a period from a first time to a second time; and a transferring step of transferring electric charges generated in the generating step into a plurality of floating diffusion regions in parallel. Electric charges transferred from different photoelectric conversion units in the transferring step are added in at least one of the plurality of floating diffusion regions, by performing the transferring step for each of the plurality of photoelectric conversion units.

An exemplary embodiment according to another aspect of the present invention is a method of driving an image pickup system provided with an image pickup apparatus that includes a plurality of photoelectric conversion units and a signal processing apparatus that processes a signal output from the image pickup apparatus. The method of the embodiment includes a generating step of generating electric charges in the photoelectric conversion unit during a period from a first time to a second time; and a transferring step of transferring electric charges generated in the generating step into a plurality of electric charge reception units in parallel. Electric charges transferred from different photoelectric conversion units in the transferring step are added in at least one of the plurality of electric charge reception units, by performing the transferring step for each of the plurality of photoelectric conversion unit.

An exemplary embodiment according to another aspect of the present invention is an image pickup apparatus that includes a plurality of photoelectric conversion units, transfer units arranged corresponding to the plurality of photoelectric conversion units, respectively, and a control unit that controls the transfer units. The transfer unit distributes electric charges generated during a period from a first time to a second time in the photoelectric conversion unit into a plurality of electric charge reception units. The control unit controls the transfer units such that electric charges distributed from different photoelectric conversion units are added in at least one of the plurality of electric charge reception units.

Further features of the present invention will become apparent from the following description of exemplary embodiments (with reference to the attached drawings).

BRIEF DESCRIPTION OF THE DRAWINGS

FIGS. 7A and 7B are schematic diagrams illustrating image pickup regions of an image pickup apparatus according to the exemplary embodiment;

FIGS. 8A and 8B are schematic diagrams illustrating image pickup regions of an image pickup apparatus according to the exemplary embodiment;

DESCRIPTION OF THE EMBODIMENTS

In the driving method disclosed in Japanese Patent Application Laid-Open No. 2006-270658, an electric charge obtained by a photodiode during a certain period is transferred to one output circuit, and an electric charge obtained by the photodiode during a subsequent period is transferred to the other output circuit. However, since signals having different exposure periods are synthesized with such driving, image quality may be degraded. Especially, when an object moving at high speed is imaged, the degradation of the image quality is more likely to become pronounced.

In the image pickup apparatus disclosed in US Patent Application Publication No. 2010/0133590, addition is performed in an information processing block. Therefore, the circuit size is easily increased. That is, downsizing of the image pickup apparatus or the image pickup system is difficult.

According to some exemplary embodiments of the present invention, the image quality can be improved without increasing the size of the image pickup apparatus or of the image pickup system.

One exemplary embodiment according to the present invention is a method of driving an image pickup apparatus that includes a plurality of photoelectric conversion units. The driving method of the present exemplary embodiment includes a transferring step of transferring an electric charge caused in one photoelectric conversion unit during a period from a first time to a second time to a plurality of electric charge reception units in parallel. Then, the transferring step of transferring an electric charge is performed with respect to a plurality of photoelectric conversion units, such that electric charges transferred from a plurality of photoelectric conversion units are added in one electric charge reception unit. Hereinafter, a principal part of an exemplary embodiment according to the present invention will be described with reference to FIGS. 1A to 1C.

Figure 1A:
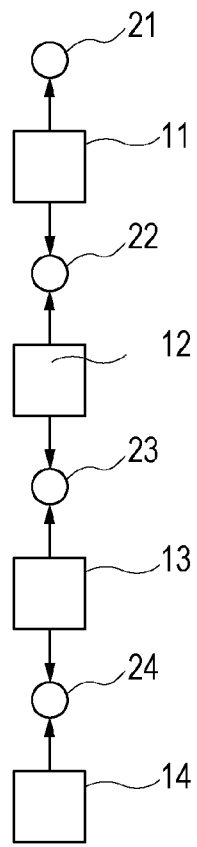
FIGS. 1A to 1C are conceptual diagrams for describing a principal part of an exemplary embodiment according to the present invention.

FIG. 1A is a conceptual diagram illustrating a principal part of an exemplary embodiment of the present invention. An image pickup apparatus includes a plurality of photoelectric conversion units. FIG. 1A schematically illustrates a layout of four photoelectric conversion units 11 to 14. In the photoelectric conversion units 11 to 14, incident light is converted into an electric charge. In other words, a signal electric charge based on the incident light is generated. The photoelectric conversion units 11 to 14 are, for example, photodiodes. The photoelectric conversion units 11 to 14 are arranged on a semiconductor substrate. The semiconductor substrate includes at least one main surface. The plurality of photoelectric conversion units may be arranged on the main surface in a one dimensional manner or in a two dimensional manner.

FIG. 1A schematically illustrates a layout of the four electric charge reception units 21 to 24. The arrows illustrate the electric charges being transferred from the photoelectric conversion units to the electric charge reception units. The electric charge reception units are transfer destinations of the electric charges from the photoelectric conversion units. Each of the electric charge reception units is electrically a single node having a predetermined capacitance value. For example, the electric charge reception unit is a semiconductor region, such as a floating diffusion region (hereinafter, FD region). Alternatively, one electric charge reception unit may include a plurality of semiconductor regions electrically connected through a wiring. For example, a plurality of semiconductor regions are arranged corresponding to the plurality of photoelectric conversion units, and the plurality of semiconductor regions is electrically connected through a wiring. Further, the electric charge reception unit may be an input node of an amplification circuit in a following stage. Further, a switch may be connected to the electric charge reception unit. The capacitance value of the electric charge reception unit may be switched by the switch. Alternatively, the plurality of electric charge reception units is electrically connected to each other by the switch to serve as one node.

As illustrated in FIG. 1A, an electric charge caused in one photoelectric conversion unit during a period of a first time to a second time is transferred to at least two electric charge reception units in parallel. For example, the electric charge of the photoelectric conversion unit 11 is transferred to the first electric charge reception unit 21 and to the second electric charge reception unit 22 in parallel. Further, the electric charge in the photoelectric conversion unit 12 is transferred to the second electric charge reception unit 22 and to the third electric charge reception unit 23 in parallel. Further, from a different point of view, the electric charge of one photoelectric conversion unit is distributed to two electric charge reception units.

As a specific means of transferring an electric charge, a transfer means like a transfer transistor is used. For example, two transfer transistors may be connected to one photoelectric conversion unit. These two transfer transistors can be arranged to electric paths between one photoelectric conversion unit and each of two electric charge reception units corresponding to the photoelectric conversion unit. As an example of driving, two transfer transistors are turned OFF and the photoelectric conversion unit starts accumulation of an electric charge, and then, the two transfer transistors are turned ON in parallel. With such driving of the transfer transistors, the electric charge caused in one photoelectric conversion unit during the period from the first time to the second time may be transferred to two electric charge reception units at a predetermined ratio. The predetermined ratio is favorably 1:1. The predetermined ratio may be changed depending on a timing at which the transfer transistors are turned ON, or on the transfer ability of the transfer transistors. By turning ON the transfer transistors simultaneously, the predetermined ratio can be 1:1, or can get closer to 1:1.

The first time and the second time are appropriately set for each photoelectric conversion unit. Note that the first time may be a time corresponding to an operation of the image pickup apparatus, such as a timing at which a mechanical shutter is opened, a timing at which an electric shutter is released, and a timing at which two transfer transistors are turned OFF. Further, the second time may be a time corresponding to an operation of the image pickup apparatus, such as a timing at which two transfer transistors are turned ON.

As another example of the transfer means, a transfer channel of an electric charge from the photoelectric conversion unit to the electric charge reception unit may be formed. In this configuration, during a period in which photoelectric conversion is performed, a generated electric charge may be transferred to any of the plurality of electric charge reception units at a predetermined probability. Favorably, the electric charge is transferred to the plurality of electric charge reception units at an equal probability. The predetermined probability may be changed depending on a structure of the transfer channel. Note that, in this case, the first time may be, for example, a time at which a mechanical shutter is opened, a time at which an electronic shutter is released, or a timing at which a node in which the electric charge is accumulated is reset. The second time may be, for example, a timing at which a mechanical shutter is closed, a timing at which an electronic shutter is operated, or a timing at which a node in which the electric charge is accumulated is reset.

Transferred electric charges are added in the electric charge reception units 21 to 24. The electric charges are added in at least one of the electric charge reception units. For example, the electric charge of the photoelectric conversion unit 11 and the electric charge of the photoelectric conversion unit 12 are transferred to the second electric charge reception unit 22 of FIG. 1A. As a result, the electric charges transferred from the two photoelectric conversion units 11 and 12 are added in the second electric charge reception unit 22. By simultaneously transferring the electric charges from the two photoelectric conversion units 11 and 12, the electric charges transferred from the respective photoelectric conversion units can be added. Alternatively, the electric charge from one photoelectric conversion unit 11 is transferred first, and then, the electric charge from the other photoelectric conversion unit 12 is transferred while the first transferred electric charge is held, so that the electric charges from the respective photoelectric conversion units can be added. At this time, the electric charge transferred from the photoelectric conversion unit 11 to the second electric charge reception unit 22 is the electric charge transferred to the second electric charge reception unit 22, by a transferring step of transferring the electric charge caused in the photoelectric conversion unit 11 during the period from the first time to the second time to the first electric charge reception unit 21 and to the second electric charge reception unit 22 in parallel. Also, the electric charge transferred from the photoelectric conversion unit 12 to the second electric charge reception unit 22 is the electric charge transferred to the second electric charge reception unit 22, by a transferring step of transferring the electric charge caused in the photoelectric conversion unit 12 during the period from the first time to the second time to the second electric charge reception unit 22 and to the third electric charge reception unit 23 in parallel.

Since the electric charge reception unit is a node having a predetermined capacitance value, a voltage of the electric charge reception unit varies in accordance with a total amount of the transferred electric charge. Even in a case where the electric charges are transferred from two photoelectric conversion units to one semiconductor region, or in a case where the electric charges are respectively transferred from two photoelectric conversion units to two semiconductor regions that are electrically connected to each other through a wiring, similar addition is conducted.

In the driving method of the present exemplary embodiment, the first time and the second time may be individually set to each of the photoelectric conversion units. The period from the first time to the second time in each of the photoelectric conversion units may be corresponding to one exposure period in the photoelectric conversion unit. A relationship between the period from the first time to the second time in each of the photoelectric conversion units and the exposure period of the image pickup apparatus will be described.

There are basically two types of exposure methods in the image pickup apparatus: a global shutter and a rolling shutter. The global shutter is an exposure method in which starts and ends of the exposure periods in all photoelectric conversion units agree. In this exposure method, the period from the first time to the second time in which an electric charge is caused in the photoelectric conversion unit 11, and the period from the first time to the second time in which an electric charge is caused in the photoelectric conversion unit 12 are the same period. That is, the first time for the photoelectric conversion unit 11 and the first time for the photoelectric conversion unit 12 are the same time. Also, the second time for the photoelectric conversion unit 11 and the second time for the photoelectric conversion unit 12 are the same time. The electric charges caused in the respective photoelectric conversion units 11 and 12 during this period are transferred to the plurality of electric charge reception units including the second electric charge reception unit 22 in parallel.

Meanwhile, the rolling shutter is an exposure method in which the lengths of the exposure periods in respective photoelectric conversion units are equal to each other, but the timings of starts and ends of the exposure periods are shifted to each other in the photoelectric conversion units. Therefore, the period from the first time to the second time in the photoelectric conversion unit 11 and the period from the first time to the second time in the photoelectric conversion unit 12 do not perfectly agree. That is, the first time for the photoelectric conversion unit 11 and the first time of the photoelectric conversion unit 12 are different times. Also, the second time for the photoelectric conversion unit 11 and the second time for the photoelectric conversion unit 12 are different times.

Next, an electric charge transferred to the electric charge reception unit other than the second electric charge reception unit 22, in parallel with the transfer of the electric charge from the photoelectric conversion unit 11 or from the photoelectric conversion unit 12 to the second electric charge reception unit 22, will be described. For example, the electric charge transferred from the photoelectric conversion unit 11 to the first electric charge reception unit 21 may be discharged instead of being added with other electric charges. That is, the first electric charge reception unit 21 may be an electric charge discharge node, to which a power source voltage is supplied. In this way, one of the electric charges transferred in parallel to the plurality of electric charge reception units from one photoelectric conversion unit may be discharged. Such a configuration may be good to be used especially in a photoelectric conversion unit arranged at an outer periphery of an image pickup region.

Alternatively, the electric charge transferred from the photoelectric conversion unit 12 to the third electric charge reception unit 23 may be added with the electric charge transferred from the photoelectric conversion unit 13 to the third electric charge reception unit 23. In this way, the electric charge transferred to the plurality of electric charge reception units in parallel from one photoelectric conversion unit may be added in the electric charge reception unit with an electric charge transferred from other photoelectric conversion units. Such a configuration may be good to be used in a case where moving average processing described below is performed.

Figure 1B:
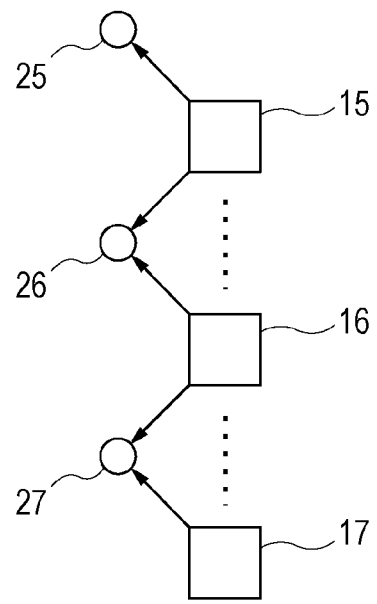

Next, a combination of the photoelectric conversion units in which the electric charges are added in the driving method of the present exemplary embodiment will be described. FIG. 1B schematically illustrates another example of a layout of the plurality of photoelectric conversion units. In FIG. 1B, three photoelectric conversion units 15 to 17 are exemplarily illustrated. In FIG. 1B, one or more photoelectric conversion units are arranged between the photoelectric conversion units 15 and 16. Also, one or more photoelectric conversion unit is/are arranged between the photoelectric conversion units 16 and 17.

In this way, the electric charges of two photoelectric conversion units having other photoelectric conversion units there between may be added in the electric charge reception unit. For example, the electric charge of the photoelectric conversion unit 15 is transferred to the electric charge reception unit 25 and to the electric charge reception unit 26 in parallel. Meanwhile, the electric charge of the photoelectric conversion unit 16 is transferred to the electric charge reception unit 26 and to the electric charge reception unit 27 in parallel. Then, the electric charge transferred from the photoelectric conversion unit 15 and the electric charge transferred from the photoelectric conversion unit 16 are added in the electric charge reception unit 27.

Figure 1C:
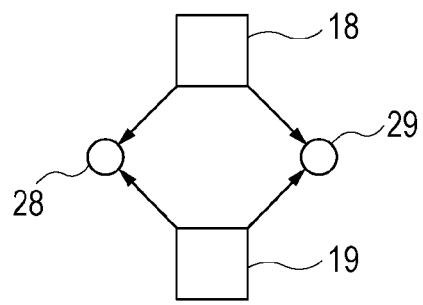

FIG. 1C schematically illustrates still another example of a layout of the image pickup apparatus. In FIG. 1C, the electric charges of the two photoelectric conversion units 18 and 19 are transferred to both of the two electric charge reception units 28 and 29 in parallel. A configuration of FIG. 1C may be good to be used in a case of performing phase difference auto focusing (AF) on an imaging surface. In this case, one light collection unit, for example, a microlens can be commonly arranged to the plurality of photoelectric conversion units.

Hereinafter, exemplary embodiments of the present invention will be described in further detail. The above description is similarly applicable to the exemplary embodiments described below. Note that the present invention is not limited by the exemplary embodiments below. Modifications in which a configuration of a part of the exemplary embodiments described below is changed without departing from the essence of the present invention are also exemplary embodiments of the present invention. Further, an example in which a configuration of a part of any of the exemplary embodiments is added to another exemplary embodiment, or an example in which a configuration of a part of any of the exemplary embodiments is replaced with a configuration of a part of another exemplary embodiment is also an exemplary embodiment.

Exemplary Embodiment 1

An exemplary embodiment of the present invention will be described. In an image pickup apparatus according to the present exemplary embodiment, each pixel includes a photoelectric conversion unit and a transfer unit that transfers an electric charge from the photoelectric conversion unit. The transfer unit of the present exemplary embodiment transfers an electric charge caused in one photoelectric conversion unit during a period from a first time to a second time to two electric charge reception units in parallel. From a different point of view, the transfer unit distributes the electric charge caused in one photoelectric conversion unit to two electric charge reception units. Then, addition of the electric charges is conducted in a node that serves as the electric charge reception unit.

Note that, in the present exemplary embodiment, the moving average processing is performed by the addition of the electric charges. Further, in the present exemplary embodiment, the exposure periods agree in all pixels. So-called a global shutter operation is performed.

Figure 2:
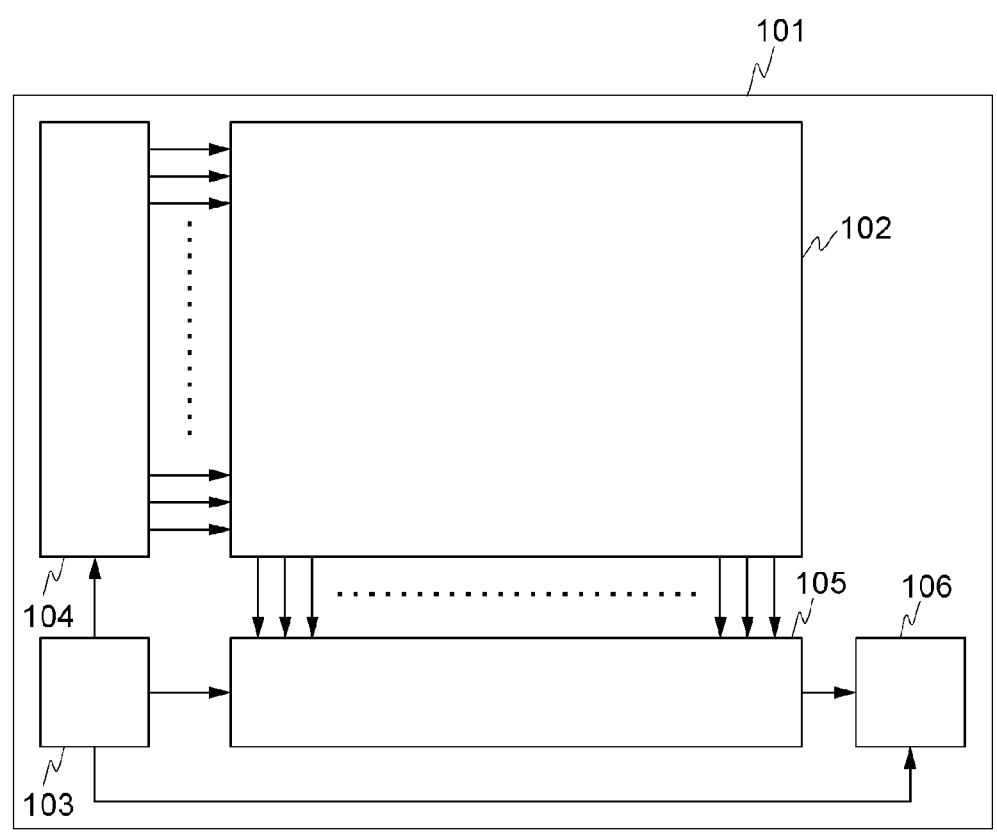
FIG. 2 is a schematic diagram illustrating a configuration of an image pickup apparatus according to the exemplary embodiment.

FIG. 2 is a block diagram of an overall image pickup apparatus of the present exemplary embodiment. An image pickup apparatus 101 can be configured from one chip using a semiconductor substrate. The image pickup apparatus 101 includes a plurality of pixels arranged on an image pickup region 102. Further, the image pickup apparatus 101 includes a control unit 103. The control unit 103 supplies a control signal, a power source voltage, and the like, to a vertical scanning unit 104, a signal processing unit 105, and to an output unit 106.

The vertical scanning unit 104 supplies a driving signal to the plurality of pixels arranged on the image pickup region 102. The vertical scanning unit 104 can supply a driving signal to the plurality of pixels in parallel. The vertical scanning unit 104 can be configured from a shift register or from an address decoder.

The signal processing unit 105 includes column circuits, a horizontal scanning circuit, and a horizontal output line. Each of the column circuits may include a plurality of circuit blocks. The circuit blocks are a signal holding unit, a column amplification circuit, a noise reduction unit, an AD conversion unit, and the like. The horizontal scanning circuit can be configured from a shift register or from an address decoder. A signal output to the horizontal output line may be an analog signal or a digital signal.

The output unit 106 outputs a signal transmitted through the horizontal output line to an outside of the image pickup apparatus 101. The output unit 106 includes a buffer or an amplification circuit.

The vertical scanning unit 104, the signal processing unit 105, and the output unit 106 are arranged outside the image pickup region 102. That is, an boundary of the image pickup region 102 lies between an element included in the pixel and an element that configures the vertical scanning unit 104, the signal processing unit 105, or the output unit 106. For example, an element isolation portion between an element included in the pixel arranged at an outermost periphery and an element that configures the vertical scanning unit 104, the signal processing unit 105, or the output unit 106 may serve as the boundary of the image pickup region 102.

Figure 3:
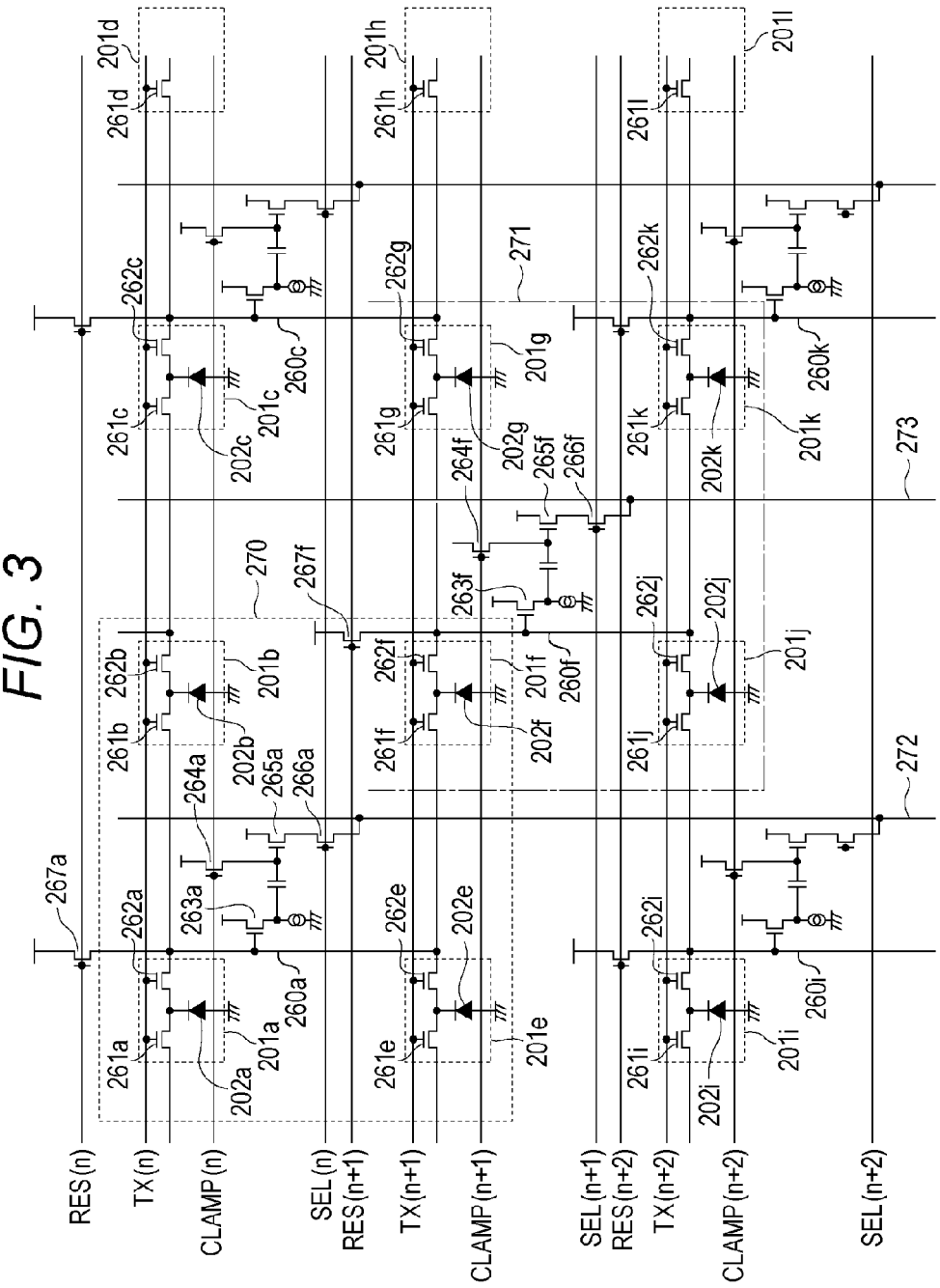
FIG. 3 is a diagram illustrating an equivalent circuit of the image pickup apparatus according to the exemplary embodiment.

FIG. 3 illustrates an equivalent circuit of the image pickup apparatus of the present exemplary embodiment. FIG. 3 illustrates twelve pixels 201. The image pickup region 102 may include more pixels 201. In the present exemplary embodiment, these pixels 201 are arranged in a matrix. The above-described twelve pixels 201 form a matrix with 3 rows and 4 columns. A pixel group that can be controlled in parallel by the vertical scanning unit is a row. A column is a pixel group arranged in a different direction from the row, and shares one or a plurality of output lines. Note that the plurality of pixels is not necessarily arranged in a matrix, and the plurality of pixels may just be arranged on the image pickup region 102 in a one dimensional manner or in a two dimensional manner.

Note that, in FIG. 3, when an individual pixel is separately described, the pixel is expressed by a combination of a numerical sign and an alphabet, like a pixel 201a. When it is not necessary to separately describe an individual pixel, the pixel is simply expressed by a numerical sign only, like a pixel 201. Note that an element having the same function is denoted with the same numerical sign. When an individual element is separately described, the element is expressed by a numeral followed by an alphabet. For example, an element included in the pixel 201a is denoted with a numeral followed by an alphabet "a". This is not limited to the present drawing, and is basically applied to the following drawings described below.

In FIG. 3, pixels 201a, 201b, 201c, and 201d are included in the first row. Pixels 201e, 201f, 201g, and 201h are included in a second row next to the first row. Further, pixels 201i, 201j, 201k, and 201l are included in a third row. Also, the pixels 201a, 201e, and 201i are included in a first column. The pixels 201b, 201f, and 201j are included in a second column next to the first column. Further, the pixels 201c, 201g, and 201k are included in a third column, and the pixels 201d, 201h, and 201l are included in a fourth column.

Next, each part of the image pickup apparatus will be described in detail. The pixel 201 includes a photoelectric conversion unit 202, a first transfer transistor 261, and a second transfer transistor 262. The image pickup apparatus includes a first amplification transistor 263, a reset transistor 267, a clamp transistor 264, a second amplification transistor 265, and a selection transistor 266 in the image pickup region 102. The first amplification transistor 263, the reset transistor 267, the clamp transistor 264, the second amplification transistor 265, and the selection transistor 266 are shared by the plurality of pixels. The elements shared by the plurality of pixels may be elements included in each of the plurality of pixels. That is, the image pickup apparatus may be a pixel amplification-type image pickup apparatus.

The photoelectric conversion unit 202 converts incident light into a signal electric charge (an electron or an electron hole). As an example of the photoelectric conversion unit 202, a photodiode is illustrated. The first transfer transistor 261 and the second transfer transistor 262 respectively transfer the signal electric charge of the photoelectric conversion unit 202. Voltages supplied to respective control nodes (transfer gates) of the first transfer transistor 261 and the second transfer transistor 262 control the transfer of the electric charge from the photoelectric conversion unit 202. The first transfer transistor 261 and the second transfer transistor 262 configure the transfer unit.

The first amplification transistor 263 configures a source follower circuit together with a current source. The first amplification transistor 263 includes an input node 260.

An output node of the first amplification transistor 263 is electrically connected to an input node of the second amplification transistor 265 through a clamp capacitor. The clamp capacitor clamps a signal output from the first amplification transistor 263. A reset noise can be reduced by clamping, in the clamp capacitor, a voltage output when the input node 260 of the first amplification transistor 263 is reset.

An output node of the second amplification transistor 265 is electrically connected to output lines 272 and 273 through the selection transistor 266. Current sources (not illustrated) are connected to the respective output lines 272 and 273. The second amplification transistor 265 configures a source follower circuit together with the current source connected to the output lines 272 or 273.

The reset transistor 267 resets a voltage of the input node 260 of the first amplification transistor 263. The clamp transistor 264 supplies a predetermined voltage to the input node of the second amplification transistor 265. The selection transistor 266 selects one second amplification transistor 265, to which an amplification signal is output.

In the exemplary embodiment, the reset transistor 267, the first amplification transistor 263, the second amplification transistor 265, the clamp transistor 264, and the selection transistor 266 are respectively MOS transistors. Note that these transistors may be configured from other types of transistors, such as a bipolar transistor.

Control lines are respectively connected to control nodes of the first and second transfer transistors 261 and 262, the reset transistor 267, the clamp transistor 264, and the selection transistor 266. The control lines are electrically connected to the vertical scanning unit 104. The vertical scanning unit 104 supplies driving signals for driving the above-described transistors to the control lines.

In the present exemplary embodiment, an electric charge caused in the photoelectric conversion unit 202 during the period from the first time to the second time is transferred to two electric charge reception units. This point will be described by taking the pixel 201f as an example. A first transfer transistor 261f transfers an electric charge of a photoelectric conversion unit 202f to an input node 260a of a first amplification transistor 263a. A second transfer transistor 262f transfers the electric charge of the photoelectric conversion unit 202f to an input node 260f of a first amplification transistor 263f. That is, the transfer unit of the pixel transfers the electric charge to two nodes of the photoelectric conversion unit 202.

In the present exemplary embodiment, a control node of the first transfer transistor 261 and a control node of the second transfer transistor 262f are mutually connected. Therefore, when a driving signal for transferring the electric charge is supplied to a transfer gate, the first and the second transfer transistors 261 and 262 are turned ON in parallel. Consequently, the electric charge caused during the period from the first time to the second time in the photoelectric conversion unit 202 is approximately equally transferred to two electric charge reception units. In other words, the electric charge caused during the period from the first time to the second time in the photoelectric conversion unit 202 is distributed to two electric charge reception units. The two electric charge reception units are, for example, the input node 260a and the input node 260f in the pixel 201f. Note that, in the present exemplary embodiment, the electric charge transferred from each photoelectric conversion unit 202 is referred to as a first signal for descriptive purpose.

In the present exemplary embodiment, the electric charges transferred from the plurality of photoelectric conversion units 202 are added in the input node 260 of the first amplification transistor 263. For example, the electric charge of four photoelectric conversion units 202a, 202b, 202e, and 202f are transferred to the input node 260a of the first amplification transistor 263a. Further, the electric charges from the above-described four photoelectric conversion units 202a, 202b, 202e, and 202f are added in the input node 260a. Therefore, the first amplification transistor 263a outputs a signal based on the total amount of the electric charges transferred from the four photoelectric conversion units 202a, 202b, 202e, and 202f to the input node 260a. Further, the electric charges from the four photoelectric conversion units 202f, 202g, 202j, and 202k are transferred to the input node 260f of the first amplification transistor 263f and are added in the input node 260f. Therefore, the first amplification transistor 263f outputs a signal based on the total amount of the electric charges transferred from the four photoelectric conversion units 202f, 202g, 202j, and 202k to the input node 260f. In this way, the first amplification transistor 263 outputs a second signal obtained by the plurality of first signal being added.

FIG. 3 exemplarily illustrates a combination of pixels, electric charges of which are added, in a broken line 270 and a dashed-dotted line 271. The electric charges from four photoelectric conversion units are added in each input node 260 of the first amplification transistor 263.

The input node 260 includes an FD region. The electric charge of the photoelectric conversion unit 202 is transferred to the FD region through the transfer transistor. The input node 260 may include only one FD region. In this case, the ratio of the area of the photoelectric conversion unit to a pixel can be enlarged, so that the sensitivity and the saturation can be improved. Alternatively, the input node 260 may include a plurality of FD regions electrically connected with a wiring. In this case, any of the FD regions can be electrically connected with the wiring. Therefore, it would be good to be used for a color image pickup apparatus. Also, the input node 260 may include a wiring that configures an electric path between the FD region and the first amplification transistor.

As described above, addition of the electric charge distributed from a certain photoelectric conversion unit and the electric charge distributed from different photoelectric conversion unit is a characteristic of the present exemplary embodiment.

Further, in the present exemplary embodiment, the moving average processing is performed by the above-described transfer and addition of electric charges. The moving average processing is, for example, to perform addition, with respect to a plurality of signals, by sequentially changing a combination of signals such that a pitch of signal median points of signals before addition and a pitch of signal median points of signals after addition are equalized. In the present exemplary embodiment, when this moving average processing is performed, a plurality of signals based on electric charges caused during the period from the first time to the second time is output in each pixel. To be specific, the electric charges caused during the period from the first time to the second time in one photoelectric conversion unit 2 is transferred to the plurality of electric charge reception units in parallel. Note that the pitch of signal median points of a plurality of signals is so-called a sampling pitch.

Figure 4A:
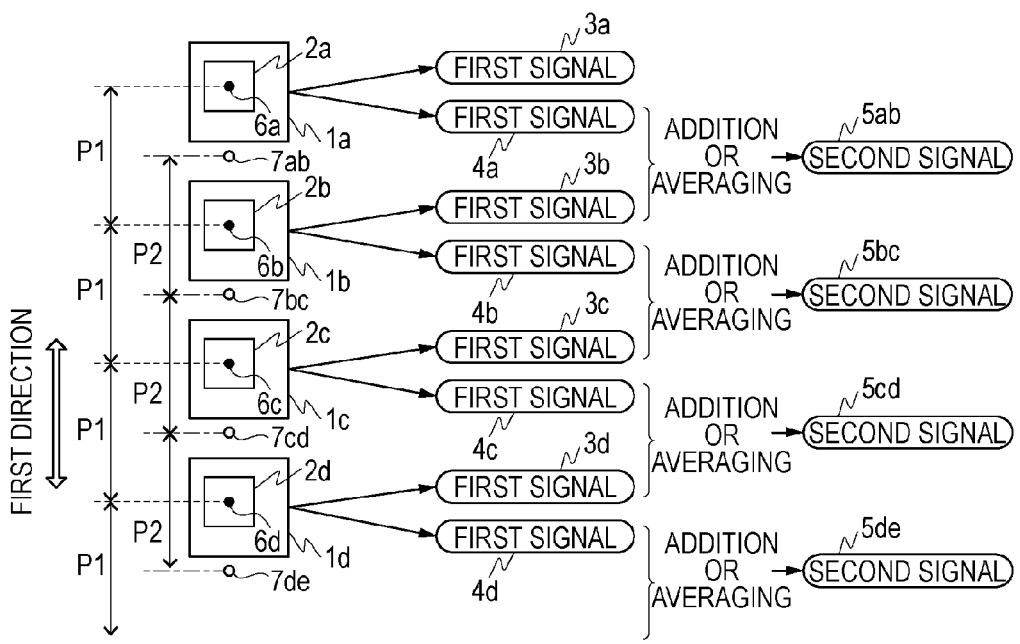
FIGS. 4A and 4B are diagrams for describing moving average processing in the exemplary embodiment.

The moving average processing will be described in further detail with reference to FIGS. 4A and 4B. FIG. 4A schematically illustrates a layout of four pixels 1*a* to 1*d*. The pixel 1 includes the photoelectric conversion unit 2. Further, in FIG. 4A, the first signals that are electric charges transferred from the photoelectric conversion unit 2 and the second signals obtained by the addition of the electric charges are indicated by arrows.

In the driving method of the present exemplary embodiment, a plurality of first signals 3 and 4 based on an electric charge caused during the period from the first time to the second time is output in each pixel. Here, start times and end times of exposure periods of the first signals 3 and 4 are substantially agree. Therefore, both of the first signals 3 and 4 are signals based on the electric charge caused during the same period. Also, the first signals 3 and 4 are signals that have not been added or averaged with signals based on the electric charges caused in other pixels 1. That is, the first signal is a signal before addition or before averaging. Note that, in the present exemplary embodiment, the first signals 3 and 4 are the electric charges respectively transferred from one photoelectric conversion unit 2 to two electric charge reception units in parallel.

In the driving method of the present exemplary embodiment, the moving average processing is performed by respectively adding the plurality of first signals 3 and 4 of one pixel with the first signals of separate pixels. To be specific, a first signal 4*a* of the pixel 1*a* and a first signal 3*b* of the pixel 1*b* are added, so that a second signal 5*ab* is obtained. A first signal 4*b* of the pixel 1*b* and a first signal 3*c* of the pixel 1*c* are added, so that a second signal 5*bc* is obtained. A first signal 4*c* of the pixel 1*c* and a first signal 3*d* of the pixel 1*d* are added, so that a second signal 5*cd* is obtained. Further, a first signal 4*d* of the pixel 1*d* and a first signal 3*e* of a pixel 1*e* (not illustrated) are added, so that a second signal 5*de* is obtained. In this way, the plurality of second signals is obtained by adding the first signals of two pixels 1. That is, the second signal is a signal after addition. Note that the addition means addition of the electric charges in the electric charge reception unit. Further, the second signal is, for example, an amplification signal output by the first amplification transistor 263 based on the total amount of the added electric charges.

Next, a relationship between the pitch of signal median points of signals before addition and the pitch of signal median points of signals after addition when the moving average processing is performed will be described. In the moving average processing, a pitch of signal median points of signals before addition and a pitch of signal median points of signals after addition are equal in a first direction. That is, the sampling pitches are not changed before/after addition or averaging. In a different point of view, when a unit length that includes signal median points of a plurality of signals before addition is considered in the first direction, the same number of signal median points of signals after addition and of signals before addition are included in the unit length. Here, the first direction is a direction parallel to a main surface of a semiconductor substrate.

FIG. 4A indicates median points 6 of the photoelectric conversion units 2 by black dots. The median point 6 of the photoelectric conversion unit 2 may be geometrically determined based on an outer edge of the photoelectric conversion unit 2 on a predetermined plane. Here, the predetermined plane is a plane parallel to the main surface of the semiconductor substrate. The photoelectric conversion unit 2 has typically a steric structure. Therefore, the outer edge of the photoelectric conversion unit 2 may be determined on a plane that cuts the photoelectric conversion unit 2.

The outer edge of the photoelectric conversion unit 2 is a PN junction surface of a semiconductor region, from which a signal electric charge is collected, from among semiconductor regions that configure the photoelectric conversion unit 2. The semiconductor region, from which a signal electric charge is collected, is an N-type semiconductor region of a photodiode in a case where the signal electric charge is an electron. Also, in a case where the pixel 1 includes a transfer transistor that controls transfer of the electric charge from the photoelectric conversion unit 2, an end of a gate electrode of the transfer transistor on a side of the photoelectric conversion unit 2 may be included in a part of the outer edge of the photoelectric conversion unit 2.

When the image pickup apparatus is manufactured using a photolithography process, a pattern of a mask used in the photolithography substantially defines the outer edge of the photoelectric conversion unit 2. For example, a pattern of a mask in a process of forming the semiconductor region, from which a signal electric charge is collected, may substantially define the outer edge of the semiconductor region, from which a signal electric charge is collected. Also, a pattern of a mask in a process of forming a gate electrode of the transfer transistor may substantially define the end of the gate electrode on the side of the photoelectric conversion unit 2.

Note that, in a case where it is difficult to determine the median point based on the outer edge of the photoelectric conversion unit 2 on the predetermined plane, or in a case where the median point is not unambiguously determined, the position of the median point may be determined based on a structure arranged on the photoelectric conversion unit 2. For example, when seen in a plane, if one opening is defined by a wiring with respect to one photoelectric conversion unit, the median point may be determined based on the shape of the opening. When one opening is not defined with respect to one photoelectric conversion unit, a median point of an optical element, such as a microlens, may be the median point of the photoelectric conversion unit.

The signal median point of the first signal based on the electric charge caused in one photoelectric conversion unit 2 is the same position as the median point 6 of the one photoelectric conversion unit 2, if the first signal is not added with other signals. That is, the signal median point of the first signal is the same position as the median point 6 of the photoelectric conversion unit 2. The first signals 3 and 4 in FIG. 4A are signals before addition. Therefore, the signal median point of the signal before addition is the same position of the median point 6 of the photoelectric conversion unit 2. If a signal based on the electric charge of one photoelectric conversion unit 2 is amplified, or is subjected to AD conversion, the position of the signal median point is not changed.

Note that, when it is not necessary to separately describe the signal median points, the signal median points of the first signals 3 and 4 and the median point of the photoelectric conversion unit 2 are denoted with the same reference sign and are described.

As illustrated in FIG. 4A, median points 6a to 6d of the four photoelectric conversion units 2a to 2d are aligned along the first direction at a pitch P1. That is, the pitch of the signal median points of the signals before addition is P1. In other words, the sampling pitch of the signals before addition is P1. An interval between the photoelectric conversion units 2 of adjacent two pixels is not necessarily perfectly equivalent to the pitch P1. For example, the interval between the photoelectric conversion units 2 of adjacent two pixels may vary due to a process of manufacturing an image pickup apparatus.

In FIG. 4A, signal median points 7 of the second signals 5 obtained by the moving average processing are indicated by white dots. The signal median point 7 of the second signal 5 is a midpoint of the signal median points 6 of two first signals to be added. For example, a signal median point 1ab of the second signal 5ab is a midpoint of the signal median point 6a of the first signal 4a of the pixel 1a and the signal median point 6b of the first signal 3b of the pixel 1b. Here, the first signals 3 and 4 are signals before addition and the second signal is a signal after addition. Therefore, the signal median point of the signal after addition is positioned at the midpoint of the signal median points of two signals before addition, which are to be added.

As illustrated in FIG. 4A, the signal median points 7ab, 7bc, 7cd, and 7de of the four second signals 5ab, 5bc, 5cd, and 5de are aligned along the first direction at a pitch P2. That is, the pitch of the signal median points of the signals after addition is P2. In other words, the sampling pitch of the signals after addition is P2.

As illustrated in FIG. 4A, the pitch P1 and the pitch P2 are equal. That is, in the driving method of the exemplary embodiment according to the present invention, addition of a plurality of signals is performed such that the pitch P1 of the signal median points of the signals before addition and the pitch P2 of the signal median points of the signals after addition are equalized. In other words, addition of a plurality of signals is performed such that the sampling pitch of a plurality of signals before addition and the sampling pitch of a plurality of signals after addition are equalized. Such addition processing is the moving average processing. Note that the pitch P1 and the pitch P2 are not necessarily equal in a strict sense. For example, the pitch P1 and the pitch P2 may have a different to the extent of dispersion due to a process of manufacturing an image pickup apparatus.

Figure 4B:
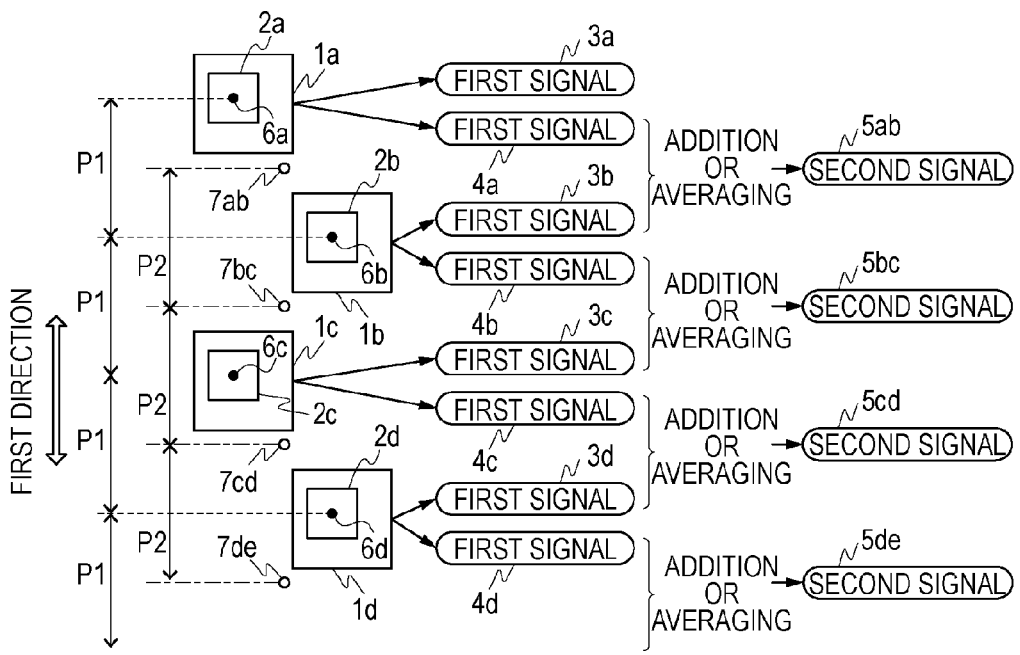

FIG. 4B illustrates an example of a layout of pixels different from FIG. 4A. In FIG. 4B, members having the same functions as FIG. 4A are denoted with the same reference signs as FIG. 4A. Also in FIG. 4B, the first signal that is the electric charge transferred from the photoelectric conversion unit 2 and the second signal obtained by addition of the electric charges are indicated by arrows.

While in FIG. 4A, the median points 6a to 6d of the four photoelectric conversion units 2a to 2d are aligned in a straight line, in FIG. 4B, the median points 6a to 6d of the four photoelectric conversion units 2a to 2d are arranged in a zigzag manner. That is, in FIG. 4B, a plurality of pixels is not aligned in a straight line. As illustrated in FIG. 4B, the moving average processing may be performed with respect to the first signals of a plurality of pixels that are not aligned in a straight line.

In this case, the pitch of the median points 6 of the photoelectric conversion units 2 and the pitch of the signal median points 7 of the second signals 5 are determined based on an interval along the first direction. The first direction is a direction parallel to the main surface of the semiconductor substrate. For example, in FIG. 4B, the photoelectric conversion unit 2a and the photoelectric conversion unit 2b are adjacently arranged. Also, the second signal 5ab and the second signal 5bc have the signal median points at positions adjacent to each other. At this time, the distance between the median point 6a of the photoelectric conversion unit 2a and the median point 6b of the photoelectric conversion unit 2b is different from the distance between the signal median point 7ab of the second signal 5ab and the signal median point 7bc of the second signal 5bc. However, the distance between the median point 6a of the photoelectric conversion unit 2a and the median point 6b of the photoelectric conversion unit 2b in the first direction and the distance between the signal median point 7ab and the signal median point 7bc in the first direction are equal.

In this way, the pitches P1 of the photoelectric conversion units 2a to 2d and the pitches P2 of the signal median points 7ab to 7de are equal based on the intervals in the first direction. That is, the moving average processing is performed with respect to a plurality of pixels that is not aligned in a straight line.

In FIGS. 4A and 4B, any photoelectric conversion units 2 of adjacent two pixels are arranged at the pitch P1. However, an image pickup apparatus to which the moving average processing can be applied is not limited to the image pickup apparatus having such a layout. The image pickup apparatus may have a layout in which a plurality of photoelectric conversion units 2 is periodically arranged with a plurality of pixels in one repetition unit. For example, in FIG. 4A, the distance between the median point 6a and the median point 6b, and the distance between the median point 6c and the median point 6d are a first distance, and the distance between the median point 6b and the median point 6c, and the distance between the median point 6d and the median point 6e may be a second distance that is different from the first distance. This is an example in which the photoelectric conversion units 2 are periodically arranged with two pixels in one repetition unit.

Further, in FIGS. 4A and 4B, an example has been described for simplification, in which a signal median point of a signal after addition (second signal) is a midpoint of signal median points of two signals before addition (first signals). However, when weighted average is performed, the signal median point can be arranged at a position that is offset from the midpoint according to the degree of weighing.

Further, in FIGS. 4A and 4B, examples have been described for simplification, in which a signal median point of a signal after addition (second signal) is a midpoint of signal median points of two signals before addition (first signals). When first signals of three or more pixels are added, a signal median point of a signal after addition is determined based on positions of signal median points of the signals before addition. Therefore, the meaning of the midpoint in the present specification is more broadly interpreted than usual meaning. To be specific, a two-dimensional coordinate, for example, an XY coordinate on a surface parallel to a main surface of a semiconductor substrate is allocated to each of the signal median points of three or more signals before addition. At this time, an average value of an X-coordinate and an average value of a Y-coordinate may respectively serve as an X-coordinate and a Y-coordinate of a signal median point of a signal after addition. In this specification, the point obtained in this way is also included in the midpoint.

When the moving average processing is performed in an image pickup apparatus in which the photoelectric conversion units 2 are not arranged at even intervals, the pitch of the signal median points of the signals before addition and the pitch of the signal median points of the signals after addition may not agree. However, in another point of view, as a result of addition of the electric charges, if the number of the signal median points of a plurality of signals before addition along the first direction in unit length, and the number of the signal median points of a plurality of signals after addition in the first direction in the same unit length are the same, it can be said that the moving average processing has been performed.

Assume that, as a specific example, in FIG. 4A, the distance from the median point 6a of the photoelectric conversion unit 2a to the median point 6d of the photoelectric conversion unit 2d is the unit length. Here, the four signal median points 6a to 6d including the signal median points 6a and 6d are positioned in this unit length. Meanwhile, in FIGS. 4A and 4B, the distance from the signal median point lab of the second signal 5ab to the signal median point 7de of the second signal 5de is equal to the distance from the median point 6a of the photoelectric conversion unit 2a to the median point 6d of the photoelectric conversion unit 2d. That is, four signal median points including the signal median points 7ab and 7de are included in the unit length.

In this way, performing addition a plurality of signals while sequentially changing a combination, such that the numbers of signal median points of signals before addition and of signals after addition can be included in unit length along a first direction, is also included in the moving average processing.

Figure 5:
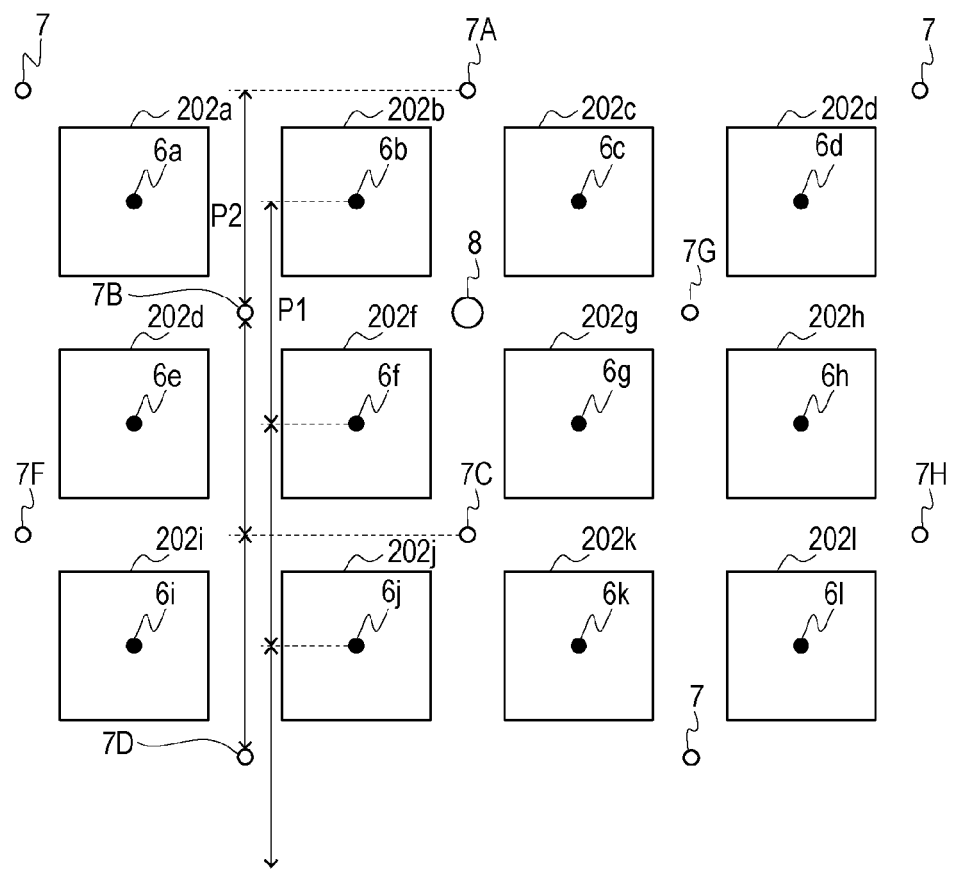
FIG. 5 is a schematic diagram illustrating a layout of pixels of the image pickup apparatus according to the exemplary embodiment.

Next, the signal median point of the second signal obtained by the moving average processing in the present exemplary embodiment will be described in detail with reference to FIG. 5. FIG. 5 schematically illustrates a layout of the photoelectric conversion units 202. Further, FIG. 5 illustrates the median points 6 of the photoelectric conversion units 202 by black dots. The position of the median point 6 of the photoelectric conversion unit 202 is the position of the signal median point 6 of the first signal of the pixel 201 including the photoelectric conversion unit 202. In the present exemplary embodiment, the first signal of the pixel 201 is the electric charge caused during the period from the first time to the second time in the photoelectric conversion unit 202 of the pixel 201 and is transferred from the photoelectric conversion unit 202. The first signal of the pixel 201 is a signal before addition.

Further, in FIG. 5, the positions of the signal median points 7 of the second signals obtained by the first signals of the plurality of pixels 201 being added are indicated by white dots. The second signal is an amplification signal output from the first amplification transistor 263 or a signal amplified in a following stage of the first amplification transistor 263, based on the total amount of the electric charges added in the input node 260.

Description will be given by taking the pixels included in the second column as an example. The signal median point of the first signal (signal before addition) of the pixel 201b is the position of the median point 6b of the photoelectric conversion unit 202b. Similarly, the signal median points of signals of the pixels 201f and 201j are positions of the median points 6f and 6j of the photoelectric conversion units 202f and 202j, respectively. These photoelectric conversion units 202b, 202f, and 202j are arranged at a predetermined pitch P1 along the column direction. That is, the pitch of the signal median points of the signals before addition is P1. In this exemplary embodiment, the column direction is the first direction.

The signal median points 7A to 7D are signal median points of the second signals (signals after addition) obtained by the first signals from a plurality of photoelectric conversion units being added. The signal median point 7A indicates the signal median point of the second signal obtained by the first signal of the pixel 201b, the first signal of the pixel 201c, and the first signals of two pixels (not illustrated) being added. The signal median point 7B is the signal median point of the second signal obtained by the first signals of four pixels surrounded by the broken line 270 of FIG. 3 being added. The signal median point 7C is the signal median point of the second signal obtained by the first signals of four pixels surrounded by the dashed-dotted line 271 of FIG. 3 being added. The signal median point 7D is the signal median point of the second signal obtained by the first signal of the pixel 201i, the first signal of the pixel 201j, and further the first signals of two pixels (not illustrated) being averaged. In the column direction, the signal median points 7A to 7D are arranged at the pitch P2.

As illustrated in FIG. 5, the pitch P1 and the pitch P2 are equal. In other words, the sampling pitches before/after addition are not changed. That is, signals of the pixels included in the second column are subjected to the moving average processing. Therefore, a signal in which moiré is reduced without decreasing the resolution in the column direction can be obtained.

Further, in the present exemplary embodiment, the first signals of a plurality of pixels arranged along the row direction are also subjected to the moving average processing. For example, the pitch of the median points 6a to 6d of the photoelectric conversion units 202e to 202h are equal to the pitch of the signal median points 7F, 7B, 7C, 7G, and 7H of signals after addition. Therefore, a signal having reduced moiré can be obtained while not reducing the resolution in the row direction.

Note that, according to the moving average processing of the present exemplary embodiment, a plurality of second signals, the signal median points of which are shifted by one pixel in the row direction and in the column direction, can be obtained. Therefore, supplementary processing based on a plurality of second signals may be performed. For example, a third signal having the signal median point at a position of the dot 8 indicated by a dashed line of FIG. 5 may be synthesized using four second signals respectively having the signal median points 7A, 7B, 7C, and 7G. With such supplementary processing, an image having high resolution, in which a noise due to a high-frequency component such as moiré is reduced, can be obtained.

Alternatively, the moving average processing may be performed with respect to the signal after addition (second signal). For example, four fourth signals respectively having the signal median points at the positions of the black dots 6a, 6b, 6e, and 6f can be obtained by adding or averaging the second signal having the signal median point 7B with the surrounding four second signals. In this way, by repeatedly performing the moving average processing, a noise due to a high-frequency component, such as moiré, can be further reduced.

The above-described supplementary processing or moving average processing on a signal after addition can be performed in a column circuit included in the signal processing unit 105. Especially, the moving average processing on a signal after addition is performed by a method to be described as an exemplary embodiment below.

Figure 6A:
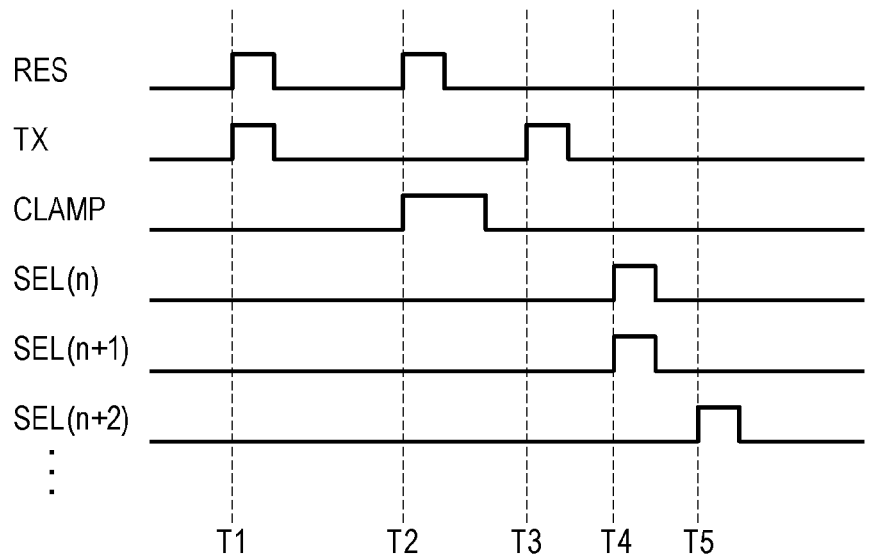
FIGS. 6A and 6B are diagrams illustrating driving signals of the exemplary embodiment.
Figure 6B:
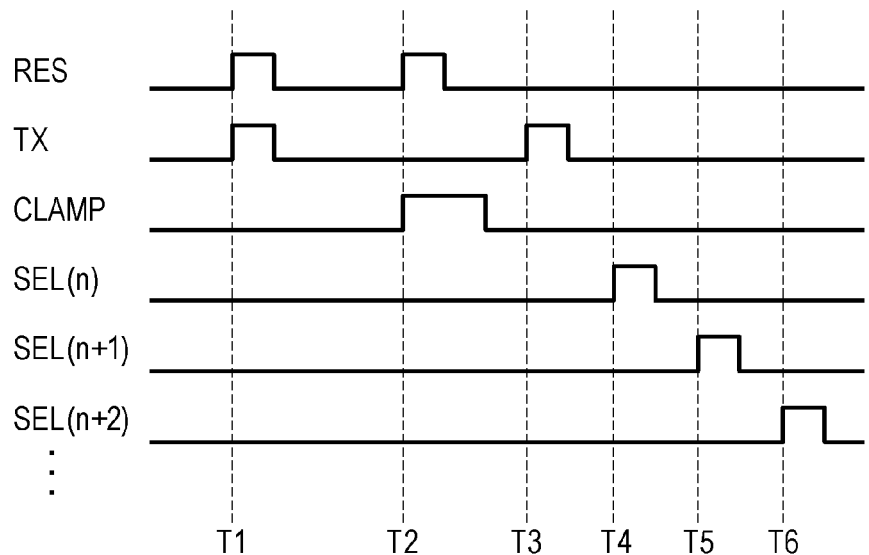

Next, a driving method of the present exemplary embodiment will be described in detail. FIGS. 6A and 6B are timing chart diagrams of driving signals. A driving signal RES is supplied to a control line connected to the reset transistor 267.

A driving signal TX is supplied to a control line connected to the control node of the first transfer transistor 261 and to the control node of the second transfer transistor 262. A driving signal CLAMP is supplied to a control line connected to the control node of the clamp transistor 264. A driving signal SEL is supplied to a control line connected to the control node of the selection transistor 266.

In the present exemplary embodiment, the driving signals RES, TX, and CLAMP are supplied to all pixels in synchronization with each other. A driving signal SEL(n), a driving signal SEL(n+1), and a driving signal SEL(n+2) are supplied to a control line of a selection transistor in a separate row.

The driving signal can receive at least two values: a high level value and a low level value. When a high level driving signal is supplied, a transistor or a switch is turned ON. When a low level driving signal is supplied, a transistor or a switch is turned OFF.

An operation of the driving signals of FIG. 6A will be described. All driving signals are at a low level before a time T1 of FIG. 6A. At the time T1, the driving signals RES and TX make a transition from the low level to the high level. Consequently, the photoelectric conversion unit 202 is reset. Following that, the driving signals RES and TX make a transition from the high level to the low level. From this point, accumulation of electric charges is started in the photoelectric conversion unit 2. That is, an exposure period is started. In the present exemplary embodiment, the first time is a time at which the first transfer transistor 261 and the second transfer transistor 262 are turned OFF after the time T1.

At a time T2, the driving signals RES and CLAMP make a transition from the low level to the high level. Consequently, voltages of the input node of the first amplification transistor 263 and of the input node 260 of the second amplification transistor 265 are reset. After a predetermined time has passed from the time T2, the driving signals RES and CLAMP make a transition from the high level to the low level. Consequently, a reset noise can be removed.

At a time T3, the driving signal TX makes a transition from the low level to the high level. At this time, the electric charge accumulated in the photoelectric conversion unit 202 of each pixel is transferred to two input nodes 260 in parallel. From a different point of view, the electric charge accumulated in the photoelectric conversion unit 202 of each pixel is distributed to the two input nodes 260. Further, at this time, the electric charge is transferred to the input nodes 260 from a plurality of photoelectric conversion units 202. Therefore, these electric charges are added in the input nodes 260. Then, a voltage of an output node of the first amplification transistor 263 is changed based on the total amount of the transferred electric charges. After a predetermined time has passed from the time T3, the driving signal TX makes a transition from the high level to the low level. Note that, in the present exemplary embodiment, the second time is a time at which the first transfer transistor 261 and the second transfer transistor 262 are turned ON. That is, at the time T3, the electric charge caused in each photoelectric conversion unit 202 during the period from the first time to the second time is transferred to two electric charge reception units in parallel.

At a time T4 or thereafter, the driving signals SEL(n), SEL(n+1), and SEL(n+2) sequentially make a transition from the low level to the high level. Consequently, a plurality of second signals is sequentially output to the output lines 272 and 273. The second signals output to the output lines 272 and 273 are transmitted to the signal processing unit 105, and are subjected to predetermined signal processing.

Since the selection transistors 266a and 266f are connected to different output lines, the driving signals SEL(n) and SEL (n+1) are synthesized in FIG. 6A. With such a driving method, a signal can be read out at high speed.

As illustrated in FIG. 6B, the driving signals SEL(n) and SEL(n+1) sequentially make a transition to the high level. According to an operation by the driving signal illustrated in FIG. 6B, the second signal is output only to one of the two output lines 272 and 273. Therefore, the same second signal can be input to two column circuits. Therefore, the moving average processing can be easily performed in the signal processing unit 105.

As described above, in the present exemplary embodiment, an electric charge caused in one photoelectric conversion unit during a period from a first time to a second time is transferred to two electric charge reception units by a transfer unit in parallel. An electric charge caused in another photoelectric conversion unit during a period from a first time to a second time is transferred to at least one of two electric charge reception units. Then, the transferred electric charges are added in the electric charge reception unit. With such a configuration, addition of signals can be performed with a simple configuration and the image quality can be improved since electric charges caused in the same period are added.

Further, in the present exemplary embodiment, the moving average processing is also performed in parallel. With such a configuration, a signal, in which a noise due to a high-frequency component such as moiré is reduced, can be obtained. Especially, in the present exemplary embodiment, the signal used in the moving average processing is the signal based on the electric charge obtained in the same period. Therefore, degradation of the image quality can be suppressed compared with a case where the moving average processing is performed using signals having different exposure periods.

Further, in the present exemplary embodiment, the moving average processing, to be specific, addition of electric charges, is performed in each pixel. Therefore, additional processing with respect to an image signal output from the image pickup apparatus can be omitted. As a result, an image pickup operation can be accelerated. Alternatively, a configuration of an overall image pickup system can be downsized.

Note that, in the present exemplary embodiment, an exposure by a global shutter is performed. Therefore, the driving signal TX is supplied to all pixels in synchronization. Therefore, by the first and second transfer transistors 261 and 262 being turned ON, the moving average processing is collectively performed with respect to signals of all pixels. That is, a plurality of addition operations is performed in parallel. According to such a configuration, a distortion of an object moving at high speed can be reduced, so that the image quality can be improved.

Note that, in a modification of the present exemplary embodiment, an exposure by a rolling shutter may be performed. In the case of a rolling shutter, parts of periods in which the electric charges are accumulated in the photoelectric conversion units in different rows are overlapped. Therefore, the image quality can be improved, compared with a case where the electric charges accumulated in two periods that are not mutually overlapped at all are added.

Exemplary Embodiment 2

Another exemplary embodiment of the present invention will be described. In the present exemplary embodiment, a color filter is provided in a pixel, which is a difference from the exemplary embodiment 1. Further, in the present exemplary embodiment, electric charges of a plurality of pixels to which color filters of the same color are arranged are added. That is, moving average processing is performed with respect to first signals of a plurality of pixels to which the color filters of the same color are arranged. In the present exemplary embodiment, parts not especially described are similar to those in the exemplary embodiment 1.

FIG. 7A schematically illustrates a plurality of pixels included in an image pickup apparatus of the present exemplary embodiment. One small square schematically represents a region to which one pixel is arranged in an image pickup region 102 of FIG. 2. A group of elements indicated as elements included in one pixel 201 in the circuit diagram of FIG. 3 is arranged in this one square.

Note that, in FIGS. 7A and 7B, a pixel is schematically illustrated by a square. However, the region of one pixel is not necessarily a square. Also, FIGS. 7A and 7B illustrate an example in which a plurality of pixels is arranged in a square lattice. However, the plurality of pixels is not necessarily arranged in a square lattice, and may just be periodically arranged in a two dimensional manner.

The circuit configurations of pixels illustrated in FIGS. 7A and 7B are similar to those in the exemplary embodiment 1. An image pickup apparatus according to the present exemplary embodiment includes an input node 260 configured from a plurality of FD regions and a wiring that electrically connects the plurality of FD regions. Therefore, like FIG. 1B, a separate pixel that is not connected to two pixels 201a and 201b can be arranged between the two pixels 201a and 201b. That is, electric changes from two photoelectric conversion units arranged to interpose a separate photoelectric conversion unit therebetween can be added. Therefore, like a Bayer array, the addition of electric charges can be performed even in a case where different color filters are arranged in adjacent pixels.

An image pickup apparatus of the present exemplary embodiment includes three color filters. FIG. 7A illustrates colors of the color filters arranged in the pixels. R indicates a first wavelength band, for example, a red color filter is arranged. Gr and Gb indicate a second wavelength band, for example, a green color filter is arranged. B indicates a third wavelength band, for example, a blue color filter is arranged. The image pickup apparatus of the present exemplary embodiment includes so-called a Bayer array color filter, as illustrated in the drawings. However, the array of the color filters is not limited to the Bayer array color filter. At least two or more color filters may just be arranged.

In FIG. 7A, a combination of pixels, electric charges of which are added, is indicated by the solid lines 301 to 312 and the dashed-dotted lines 313 to 324. In the present exemplary embodiment, electric charges of photoelectric conversion units of a plurality of pixels to which color filters of the same color are arranged are added from among the plurality of pixels surrounded by the solid line or the dashed-dotted line.

Sixteen pixels surrounded by the solid line 301 will be described as an example. First, an electric charge of a photoelectric conversion unit of each pixel is transferred to two input nodes 260 in parallel, similarly to the exemplary embodiment 1.

A pixel A1, a pixel A3, a pixel C1, and a pixel C3 share one input node 260. That is, the electric charges caused during a period from a first time to a second time in the photoelectric conversion units in the pixel A1, the pixel A3, the pixel C1, and the pixel C3 are added in one input node 260. Consequently, a second signal corresponding to red (the color filter R) can be obtained. Similarly to other colors. Here, green color filters are arranged to the pixels indicated by Gr and the pixels indicated by Gb. However, first signals are added as different combinations.

The electric charges of the same color pixels are added in the sixteen pixels surrounded by other solid lines 302 to 312 and the dashed-dotted lines 313 to 324. Note that, in FIGS. 7A and 7B, the number of pixels surrounded by the dashed-dotted lines 316, and 320 to 324 is less than sixteen. However, in reality, pixels (not illustrated) are included.

In the present exemplary embodiment, moving average processing is performed with respect to signals of a plurality of pixels to which color filters of the same color are arranged. As a specific example, addition of first signals of the pixel C3 will be described. Four first signals of the pixels A1, A3, C1, and C3 surrounded by the solid line 301 are added. Meanwhile, four signals of the pixels C3, C5, E3, and E5 surrounded by the dashed-dotted line 313 are added.

FIG. 7B illustrates signal median points of second signals obtained by addition. FIG. 7B illustrates pixels at which the signal median points of the second signals obtained by addition by R, Gb, Gr, or B. For example, the signal median point of the second signal obtained by the addition of the first signals of the pixels A1, A3, C1, and C3 in FIG. 7A is positioned in a region of the pixel B2.

A relationship between a pitch of signal median points of signals before addition and a pitch of signal median points of signals after addition will be described with reference to FIGS. 7A and 7B. In FIG. 7A, for example, green color filters Gr are arranged in pixels A6, C6, E6, G6, I6, and K6 included in the sixth column. These pixels A6, C6, E6, G6, I6, and K6 are arranged at a pitch of two pixels. That is, the signal median points of the first signals of the pixels A6, C6, E6, G6, I6, and K6 are aligned at the pitch of two pixels. In the present exemplary embodiment, the column direction is a first direction.

As the moving average processing for the pixels A6, C6, E6, G6, I6, and K6, addition of first signals of pixels to which the same green color filters Gr are arranged is performed in combinations of pixels indicated by the solid lines 302, 306, and 310, and the dashed-dotted lines 313, 317, and 321. In FIG. 7B, signal median points of second signals obtained by the addition in the above-described combinations are positioned at the pixels B7, D5, F7, H5, J7, and L5. That is, the signal median points of the second signals of the green color filters Gr are aligned at a pitch of two pixels in the column direction. In this way, in the present exemplary embodiment, the moving average processing is performed with respect to signals of a plurality of pixels of the same color.

As described above, in the present exemplary embodiment, the moving average processing is performed for each color in the image pickup apparatus including color filters of a plurality of colors. According to such a configuration, color mixture can be reduced in addition to the effect of the exemplary embodiment 1.

Exemplary Embodiment 3

Another exemplary embodiment of the present invention will be described. In the present exemplary embodiment, a combination of pixels with which the moving average processing is performed is different from the exemplary embodiments 1 and 2. To be specific, additions of four combinations are performed with respect to a first signal of one pixel. Therefore, an electric charge caused during a period from a first time to a second time in one pixel is transferred to four electric charge reception units in parallel. Parts not especially described in the present exemplary embodiment are similar to those in the exemplary embodiment 1 or 2.

FIG. 8A schematically illustrates a plurality of pixels included in an image pickup apparatus of the present exemplary embodiment. Marks of positions of pixels are similar to those in FIGS. 7A and 7B. Also, color filters are arranged to the pixels in the present exemplary embodiment.

In the present exemplary embodiment, addition of first signals is performed with respect to one pixel in four different combinations including the one pixel. The four combinations are combinations of pixels indicated by a solid line 401, a broken line 402, a dashed-dotted line 403, and a dashed-two dotted line 404.

To be specific, a pixel C3 will be described as an example. As a first combination, electric charges of photoelectric conversion units of four pixels A1, A3, C1, and C3 are added. As a second combination, electric charges of photoelectric conversion units of four pixels A3, A5, C3, and C5 are added. As a third combination, electric charges of photoelectric conversion units of four pixels C1, C3, E1, and E3 are added. Also, as a fourth combination, electric charges of photoelectric conversion units of four pixels C3, C5, E3, and E5 are added. Addition of first signals is performed in four different combinations, when focusing on a certain pixel, with respect to pixels to which color filters of other colors are arranged.

To perform the moving average processing like the above, in an image pickup apparatus according to the present exemplary embodiment, an electric charge of a photoelectric conversion unit of one pixel is transferred to four electric charge reception units in parallel. For example, four transfer transistors are connected to one photoelectric conversion unit.

FIG. 8B illustrates signal median points of a plurality of second signals obtained by addition of the electric charges. FIG. 8B illustrates pixels at which the signal median points of the second signals are positioned by R, Gb, Gr, or B. For example, the signal median point of the second signal obtained by addition of the first signals of the pixels A1, A3, C1, and C3 of FIG. 8A is positioned at a region of the pixel B2.

In the present exemplary embodiment, addition is performed in four different combinations with respect to a first signal of one pixel. Therefore, the second signals obtained by addition can be more obtained. When comparing FIGS. 7A and 8A, arrays of pixels are the same in the exemplary embodiments 2 and 3. However, in the exemplary embodiment 2, there are pixels, such as the pixels B4, B5, C4, and C5 in FIG. 7B, to which a signal median point of a signal after addition is not arranged. In contrast, in the present exemplary embodiment, as illustrated in FIG. 8B, signal median point of signals after addition are arranged in the pixels excluding pixels at an outer periphery. That is, the second signals that are signals after addition can be more obtained. As a result, an image having high resolution can be obtained.

Note that, in the exemplary embodiments 1 and 2, an image having high resolution can be obtained by performing supplementary processing based on a plurality of second signals obtained by addition of a plurality of first signals. In contrast, according to the present exemplary embodiment, such supplementary processing can be omitted.

As described above, according to the present exemplary embodiment, an image having high resolution can be obtained in addition to the effect of the exemplary embodiments 1 or 2.

Exemplary Embodiment 4

Another exemplary embodiment of the present invention will be described. The present exemplary embodiment has a characteristic in which low-pass filter processing is performed in a signal processing unit with respect to a plurality of second signals obtained by the moving average processing in the exemplary embodiments 1 to 3. The low-pass filter processing may be the moving average processing. Alternatively, usual pixel addition may be employed. Hereinafter, a configuration of the signal processing unit and signal processing thereof will be described. All other configurations are similar to those in the exemplary embodiments 1 to 3.

FIG. 2 is an overall block diagram of an image pickup apparatus of the present exemplary embodiment. An image pickup apparatus 101 can be configured from one chip using a semiconductor substrate. The image pickup apparatus 101 includes a plurality of pixels arranged on an image pickup region 102. In the present exemplary embodiment, configurations of the image pickup region 102, a control unit 103, a vertical scanning unit 104, and an output unit 106 are similar to those in the exemplary embodiments 1 to 3, and therefore, detailed description is omitted.

Figure 9:
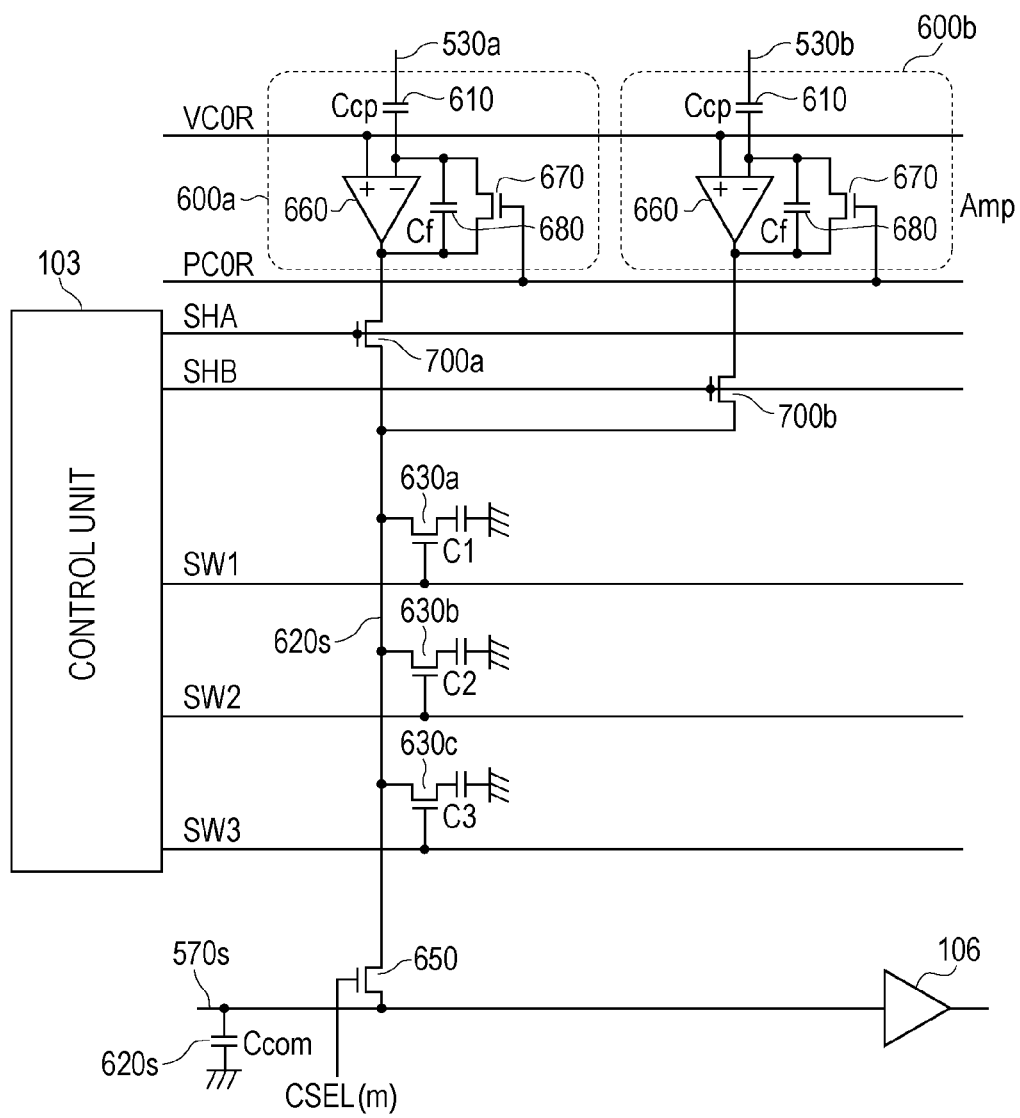
FIG. 9 is a diagram illustrating an equivalent circuit of a signal processing unit of an image pickup apparatus according to the exemplary embodiment.

FIG. 9 is an equivalent circuit illustrating a part of the signal processing unit 105. FIG. 9 illustrates a column circuit and a horizontal output line included in the signal processing unit 105. FIG. 9 illustrates column circuits of two columns. In reality, a number of column circuits are arranged corresponding to pixel columns arranged on the image pickup region 102.

Second signals obtained by the moving average processing in the image pickup region 102 are input to output lines 530a and 530b. When the image pickup region 102 has the configuration of FIG. 3, the output lines 530a and 530b correspond to the output lines 272 and 273 of FIG. 3.

Column amplification circuits 600a and 600b respectively output amplification signals obtained by amplifying signals of the output lines 530a and 530b. The column amplification circuits 600a and 600b are respectively configured from operation amplifiers 660, capacitors 610, capacitors 680, and feedback switches 670.

The output line 530 is electrically connected to an inverting input terminal of the operation amplifier 660 through the capacitor 610. A predetermined voltage VCOR is supplied to a non-inverting input terminal of the operation amplifier 660. The feedback switch 670 and the capacitor 680 are arranged in parallel in an electric path between the inverting input terminal and an output terminal of the operation amplifier 660. A control line is connected to a control node of the feedback switch 670. A driving signal PC0R is supplied to the control node of the feedback switch 670.

The output nodes of the column amplification circuits 600a and 600b are electrically connected to a node 620s through sample hold switches (hereinafter, SH switches) 700a and 700b, respectively. Capacitors C1, C2, and C3 are electrically connected to the node 620s through first to third memory selection switches 630a, 630b, and 630c.

The node 620s is electrically connected to a horizontal output line 570s through a horizontal transfer switch 650. The horizontal transfer switch 650 is controlled by a driving signal CSEL supplied from a horizontal scanning circuit (not illustrated). The horizontal output line 570s is electrically connected to the output unit 106.

Figure 10:
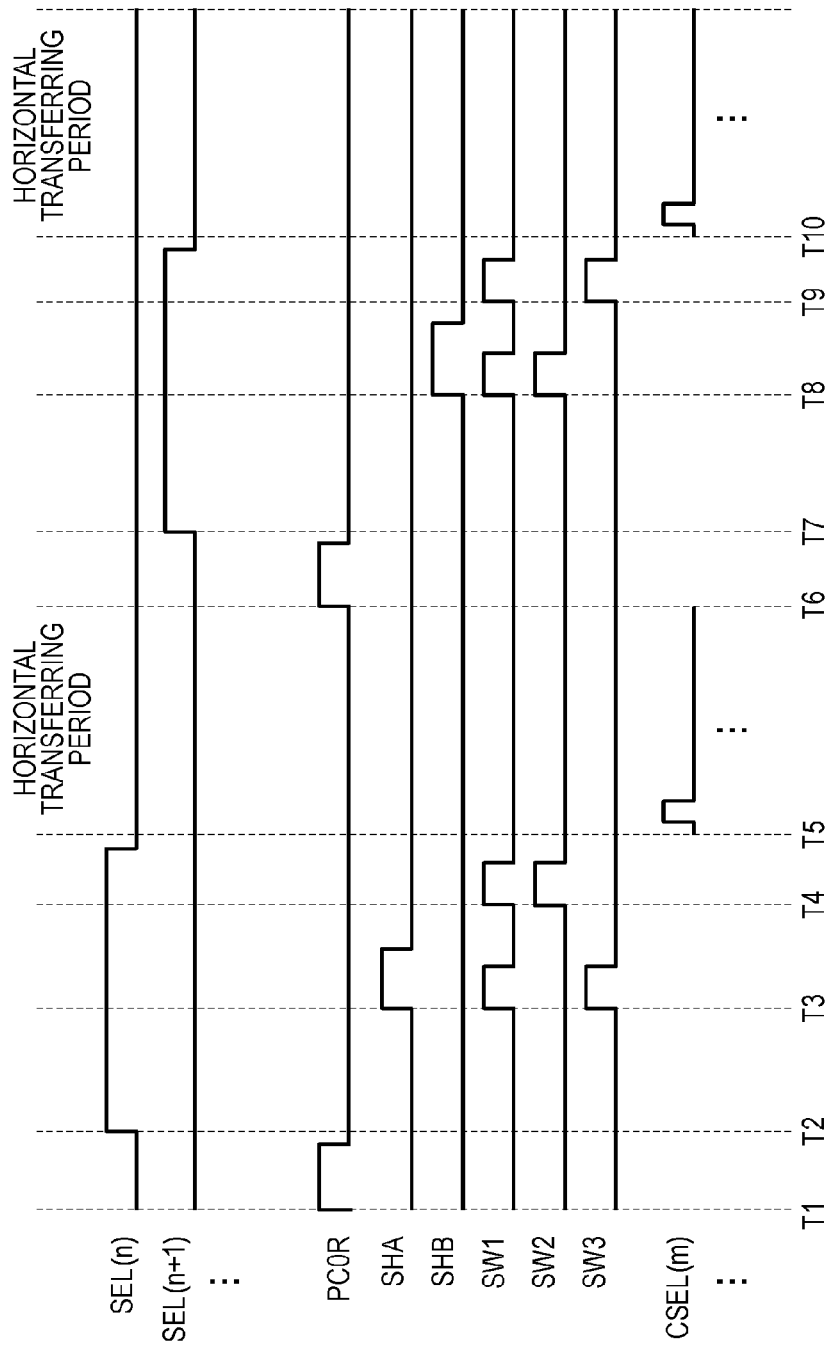
FIG. 10 is a diagram illustrating driving signals of the exemplary embodiment.

Next, a driving method of the present exemplary embodiment will be described in detail. FIG. 10 is a timing chart diagram of driving signals. Driving signals SEL(n) and SEL(n+1) of FIG. 10 correspond to the driving signals SEL(n) and SEL(n+1) of FIGS. 6A and 6B. That is, the driving signals SEL(n) and SEL(n+1) of FIG. 10 are respectively supplied to selection transistors of the image pickup region 102. FIG. 10 illustrates timing charts of around a period in which the driving signals SEL(n) and SEL(n+1) become a high level in FIGS. 6A and 6B.

In FIG. 10, the driving signal PC0R is supplied to a control line connected to the feedback switch 670. Driving signals SHA and SHB are respectively supplied to control lines connected to control nodes of the SH switches 700a and 700b. Driving signals SW1 to SW3 are respectively supplied to control lines connected to control nodes of the memory selection switches 630a, 630b, and 630c. A driving signal CSEL (m) is supplied to a control line connected to a control node of the horizontal transfer switch 650.

In the present exemplary embodiment, the control unit 103 supplies the driving signals PC0R, SHA, SHB, and SW1 to SW3. Also, the horizontal scanning circuit supplies the driving signal CSEL(m).

The driving signals can take at least two values: a high level and a low level. When a high level driving signal is supplied, a transistor or a switch is turned ON. When a low level driving signal is supplied, a transistor or a switch is turned OFF.

The moving average processing has been performed before a time T1. That is, operations from the time T1 to the time T4 of FIGS. 6A and 6B have been performed before the time T1. Also, a signal of (n−1) row that is a previous read row is held in the capacitor C1 and the capacitor C2.

At the time T1, the driving signal PC0R makes a transition from the low level to the high level. Other driving signals are at the low level. Consequently, the column amplification circuits 600a and 600b are reset. Note that, at this time, a predetermined voltage is supplied to the output lines 530a and 530b. Alternatively, a signal based on a state in which a voltage of an input node of the second amplification transistor 265a is reset may be output to the output line 530a. After a predetermined time has passed from the time T1, the driving signal PC0R makes a transition from the high level to the low level.

At the time T2, the driving signal SEL(n) makes a transition from the low level to the high level. Consequently, a second signal obtained by the moving average processing in the image pickup region 102 is output to the output line 530a.

Next, at the time T3, the driving signals SHA, SW1, and SW3 make a transition from the low level to the high level. Consequently, the column amplification circuit 600a amplifies the second signal of the output line 530a, and outputs an amplification signal to the node 620s. Then, the amplification signal output from the column amplification circuit 600a is held in the capacitors C1 and C3. After a predetermined time has passed from the time T3, the driving signals SHA, SW1, and SW3 make a transition from the high level to the low level.

At the time T4, the driving signals SW1 and SW2 make a transition from the low level to the high level. Consequently, the signal (the amplification signal based on the second signal) held in the capacitor C1 and the signal (the amplification signal based on the second signal) held in the capacitor C2 are averaged in the node 620s. At this time, the signal read out at the time T3 is held in the capacitor C1. Also, a signal of (n−1) row that is a previous read row is held in the capacitor C2. That is, at the time T4, the second signal of (n−1) row and the second signal of n row are averaged. After a predetermined time has passed from the time T4, the driving signals SW1 and SW2 make a transition from the high level to the low level.

A horizontal transferring period starts from the time T5. To be specific, a horizontal scanning circuit sequentially outputs the driving signal CSEL. Consequently, the signal of the node 620s is output to the horizontal output line 570s by capacitor division. The signal output to the horizontal output line 570s is output outside the image pickup apparatus by the output unit 106.

Next, at the time T6, the driving signal PC0R makes a transition from the low level to the high level. Consequently, the feedback switch 670 is turned ON, and the column amplification circuits 600a and 600b are reset. Note that, at this time, a predetermined voltage is supplied to the output lines 530a and 530b. Alternatively, a signal based on a state in which a voltage of an input node of the second amplification transistor 265f is reset may be output to the output line 530b. After a predetermined time has passed from the time T6, the driving signal PC0R makes a transition from the high level to the low level.

At the time T7, the driving signal SEL(n+1) makes a transition from the low level to the high level. Consequently, a signal obtained by the moving average processing in the image pickup region 102 is output to the output line 530b.

Next, at the time T8, the driving signals SHB, SW1, and SW2 make a transition from the low level to the high level. Consequently, the column amplification circuit 600b amplifies a second signal of the output line 530b, and outputs an amplification signal to the node 620s. Then, the amplification signal output from the column amplification circuit 600b is held in the capacitor C1 and the capacitor C2. After a predetermined time has passed from the time T8, the driving signals SHB, SW1, and SW2 make a transition from the high level to the low level.

At the time T9, the driving signals SW1 and SW3 make a transition from the low level to the high level. Consequently, the signal (the amplification signal based on the second signal) held in the capacitor C1 and the signal (the amplification signal based on the second signal) held in the capacitor C3 are averaged in the node 620s. At this time, the signal read out at the time T8 is held in the capacitor C1. Also, the signal of n row that is a previous read out row and read out at the time T3 is held in the capacitor C2. That is, at the time T4, the second signal of n row and the second signal of (n+1) row are averaged. After a predetermined time has passed from the time T4, the driving signals SW1 and SW2 make a transition from the high level to the low level.

A horizontal transferring period starts from the time T10. To be specific, the horizontal scanning circuit sequentially outputs the driving signal CSEL. Consequently, the signal of the node 620s is output to the horizontal output line 570s by capacitor division. The signal output to the horizontal output line 570s is output outside of the image pickup apparatus by the output unit 106.

Here, the driving signals SEL(n−1), SEL(n), SEL(n+1), SEL(n+2), . . . , are sequentially turned to the high level, so that the second signals output from the image pickup region 102 become Sn−1, Sn, Sn+1, Sn+2, . . . . In the present exemplary embodiment, in the signal processing unit, a third signal obtained by averaging a signal Sn−1 and a signal Sn, a third signal obtained by averaging a signal Sn and a signal Sn+1, a third signal obtained by averaging a signal Sn+1 and a signal Sn+2, . . . are sequentially output. That is, the moving average processing is performed.

As described above, in the present exemplary embodiment, a plurality of second signal obtained by the moving average processing in the image pickup region 102 is further subjected to the moving average processing in the signal processing unit 105. According to such a configuration, a high-frequency component such as moiré can be further reduced in addition to any effect of the exemplary embodiments 1 to 3.

Also, in a modification of the present exemplary embodiment, usual pixel addition is performed. In this case, two second signals having signal median points by one pixel each in the row direction and in the column direction may just be averaged. For example, in FIG. 5, the second signal having the signal median point 7A and the second signal having the signal median point 7B are averaged. Also, the second signal having the signal median point 7C and the second signal having the signal median point 7D are averaged. Meanwhile, the second signal having the signal median point 7B and the second signal having the signal median point 7C are not averaged. Consequently, a pitch of signals after averaging becomes double compared with a pitch of signals before averaging. That is, although the resolution is decreased, the image quality and the frame rage can be improved instead.

Exemplary Embodiment 5

Another exemplary embodiment of the present invention will be described. An image pickup apparatus according to the present exemplary embodiment includes a holding capacitor that holds a second signal in an electric path between a second amplification transistor and an output line. Then, second signals held in the holding capacitor are sequentially read out. Other parts are similar to any of the exemplary embodiments 1 to 4. Thus, only different points from the exemplary embodiments 1 to 4 will be described.

Figure 11:
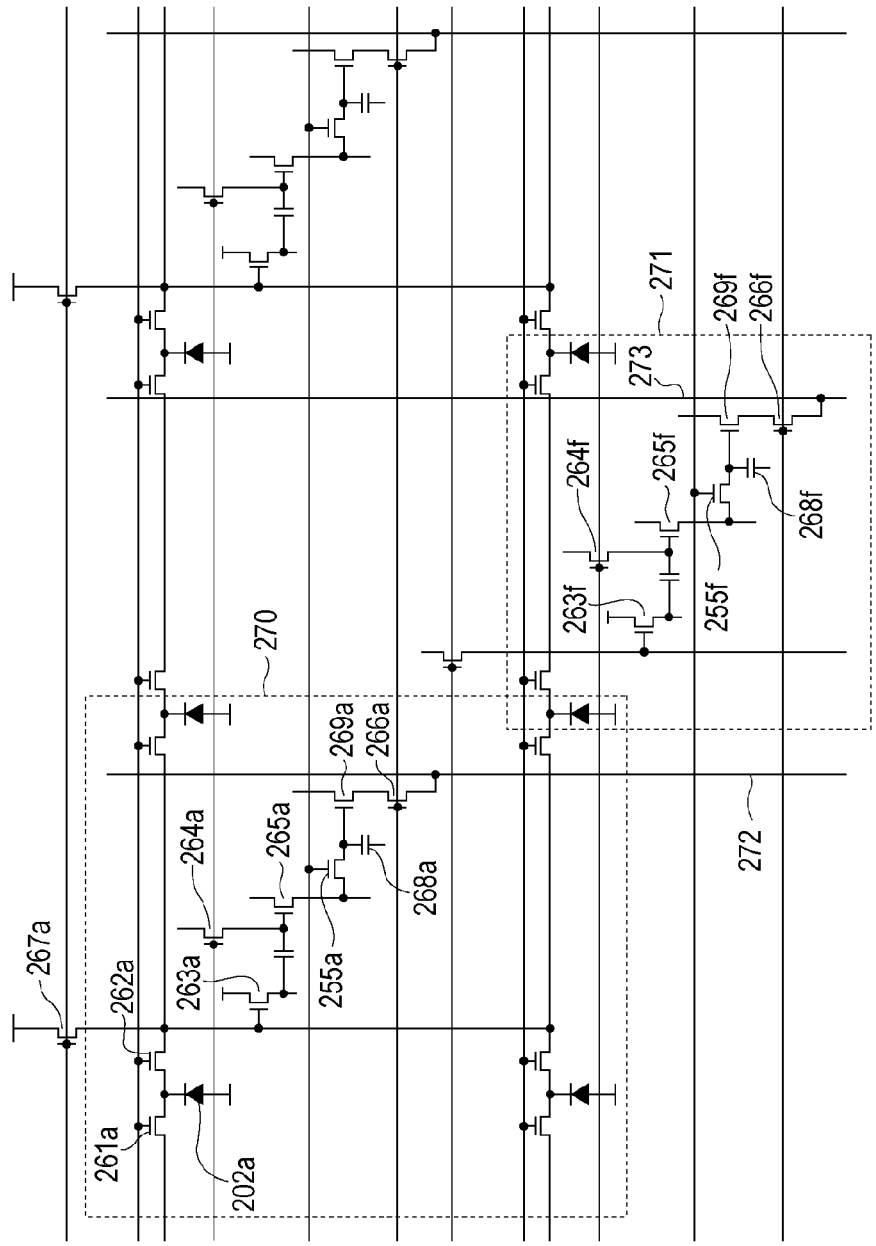
FIG. 11 is a diagram illustrating an equivalent circuit of an image pickup apparatus according to the exemplary embodiment.

FIG. 11 illustrates an equivalent circuit of an image pickup apparatus of the present exemplary embodiment. Parts having similar functions to those in FIG. 3 are denoted with the same reference signs and detailed description is omitted. Also, elements having the same functions are denoted with the same numerical signs.

An SH switch 255, a holding capacitor 268, and a third amplification transistor 269 are arranged in an electric path between a second amplification transistor 265 and output lines 272 and 273. A selection transistor 266 is arranged in an electric path between a third amplification transistor 269 and output lines 272 and 273. The SH switch 255 and the third amplification transistor 269 are, for example, MOS transistors. The first amplification transistor 263 and the second amplification transistor respectively configure a current source and a source follower circuit (not illustrated).

A signal output from the second amplification transistor 265 is transmitted to the holding capacitor 268 through the SH switch 255. By the SH switch 255 being turned OFF, the holding capacitor 268 holds the signal. Since a second signal obtained by an electric charge being added is output from the second amplification transistor 265, the second signal is held in the holding capacitor 268.

The third amplification transistor 269 outputs the second signal held in the holding capacitor 268 to the output lines 272 and 273. The selection transistor 266 selects one third amplification transistor 269 that outputs a signal.

According to the present exemplary embodiment, until the second signal is read out to the output lines 272 and 273, the second signal can be held in the holding capacitor 268. If a signal is held in the holding capacitor 268, an effect such as a dark current can be reduced, compared with a case in which a signal is held in a node including an FD region, such as an input node 260. That is, according to the present exemplary embodiment, a noise can be reduced in addition to the effects of the exemplary embodiments 1 to 4.

Exemplary Embodiment 6

Another exemplary embodiment of the present invention will be described. An image pickup apparatus according to the present exemplary embodiment includes a selection transistor in an electric path between an output node of a first amplification transistor and an output line. Further, a second transistor and a third transistor are omitted. Other parts are similar to any of the exemplary embodiments 1 to 4. Thus, only different points from the exemplary embodiments 1 to 4 will be described.

Figure 12:
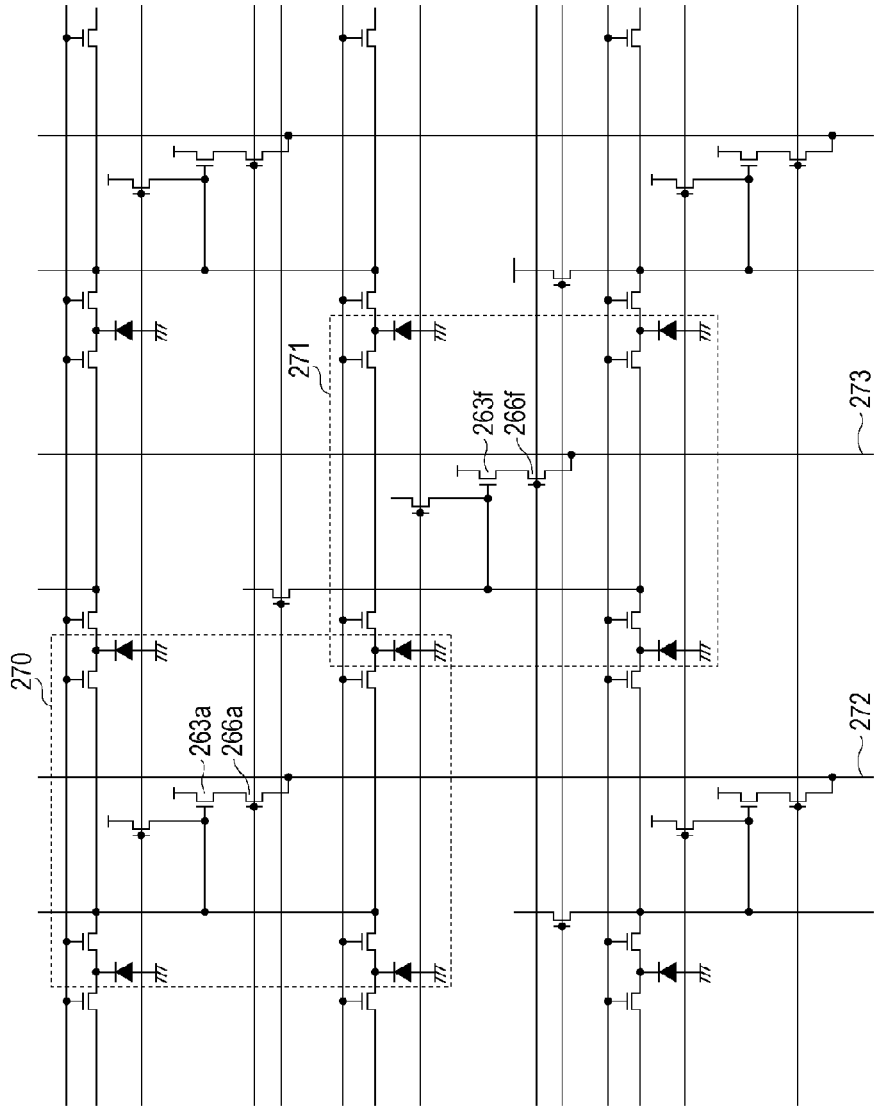
FIG. 12 is a diagram illustrating an equivalent circuit of an image pickup apparatus according to the exemplary embodiment.

FIG. 12 illustrates an equivalent circuit of an image pickup apparatus of the present exemplary embodiment. Parts having the same functions as those in FIG. 3 are denoted with the same reference signs, and detailed description is omitted. Also, elements having the same functions are denoted with the same numerical signs.

A first amplification transistor 263 outputs a second signal based on an electric charge added in an input node 260 to output lines 272 and 273. A selection transistor 266 selects one first amplification transistor 263 that outputs a signal.

According to the present exemplary embodiment, the number of transistors arranged on an image pickup region can be reduced, and therefore the ratio of photoelectric conversion units can be increased. As a result, the sensitivity and the saturation can be improved. That is, according to the present exemplary embodiment, the sensitivity and the saturation can be improved in addition to the effects of the exemplary embodiments 1 to 4.

Exemplary Embodiment 7

Still another exemplary embodiment of the present invention will be described. In the present exemplary embodiment, two transistors connected to one photoelectric conversion unit are controlled independently of each other, which is different from the exemplary embodiment 1. All other parts are similar to those in the exemplary embodiment 1. Thus, points different from the exemplary embodiment 1 will be mainly described. Parts, description of which has been omitted, are similar to those in the exemplary embodiment 1.

Figure 13:
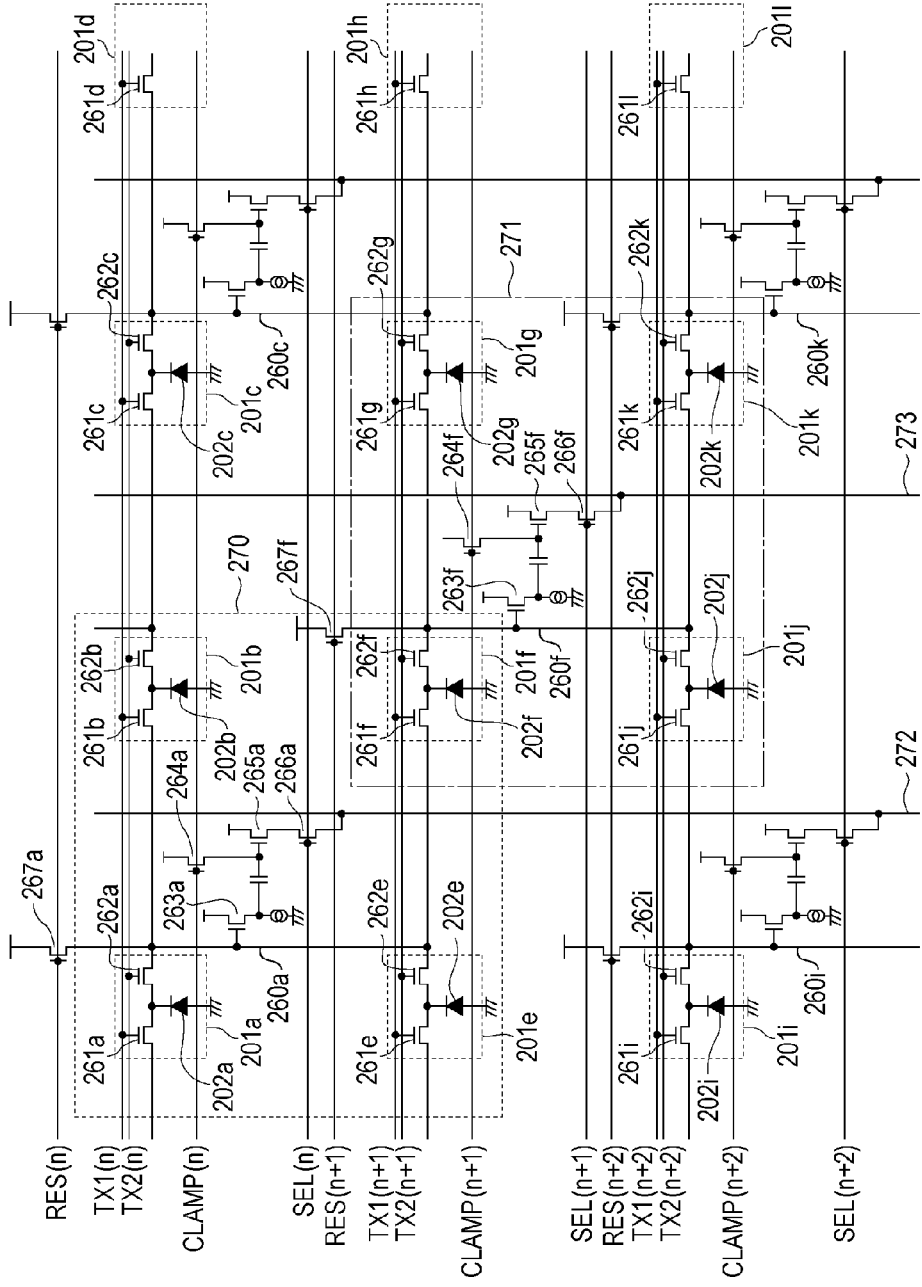
FIG. 13 is a diagram illustrating an equivalent circuit of an image pickup apparatus according to the exemplary embodiment.

FIG. 13 illustrates an equivalent circuit of an image pickup apparatus of the present exemplary embodiment. Parts same as those of FIG. 3 are denoted with the same reference signs. Detailed description of the parts same as those of FIG. 3 are omitted.

As illustrated in FIG. 13, in the present exemplary embodiment, separate control lines are electrically connected to a control node of a first transfer transistor 261 and a control node of a second transfer transistor 262, respectively. A driving signal TX1 is supplied to the control line connected to the control node of the first transfer transistor 261. A driving signal TX2 is supplied to the control line connected to the control node of the second transfer transistor 262.

The image pickup apparatus of FIG. 13 is driven in two modes. The first mode is similar to the driving method of the exemplary embodiment 1. That is, the driving method in the first mode includes a transferring step of transferring an electric charge from one photoelectric conversion unit to two electric charge reception units in parallel.

A driving method in the second mode includes a transferring step of transferring an electric charge from one photoelectric conversion unit to only one electric charge reception unit. According to the driving method in this second mode, a signal based on the electric charge accumulated in each photoelectric conversion unit 202 can be individually read out. Therefore, an image having high resolution can be obtained.

These first mode and second mode can be switched by a control unit 103, for example. Alternatively, the first mode and the second mode may be switched by a signal from an outside of the image pickup apparatus.

As described above, in the present exemplary embodiment, the image pickup apparatus can be driven by switching the first mode and the second mode. Therefore, an image having high resolution can be obtained in addition to the effect of the exemplary embodiment 1.

Exemplary Embodiment 8

Still another exemplary embodiment of the present invention will be described. Phase difference AF on an imaging surface is a characteristic of the present exemplary embodiment. Thus, points different from the exemplary embodiment 1 will be mainly described. Parts, description of which has been omitted, is similar to those in the exemplary embodiment 1.

FIG. 2 is an overall block diagram of an image pickup apparatus of the present exemplary embodiment. An image pickup apparatus 101 can be configured from one chip using a semiconductor substrate. The image pickup apparatus 101 includes a plurality of pixels arranged on an image pickup region 102. In the present exemplary embodiment, configurations of a control unit 103, a vertical scanning unit 104, and an output unit 106 are similar to those of the exemplary embodiment 1, and therefore, detailed description is omitted.

Figure 14:
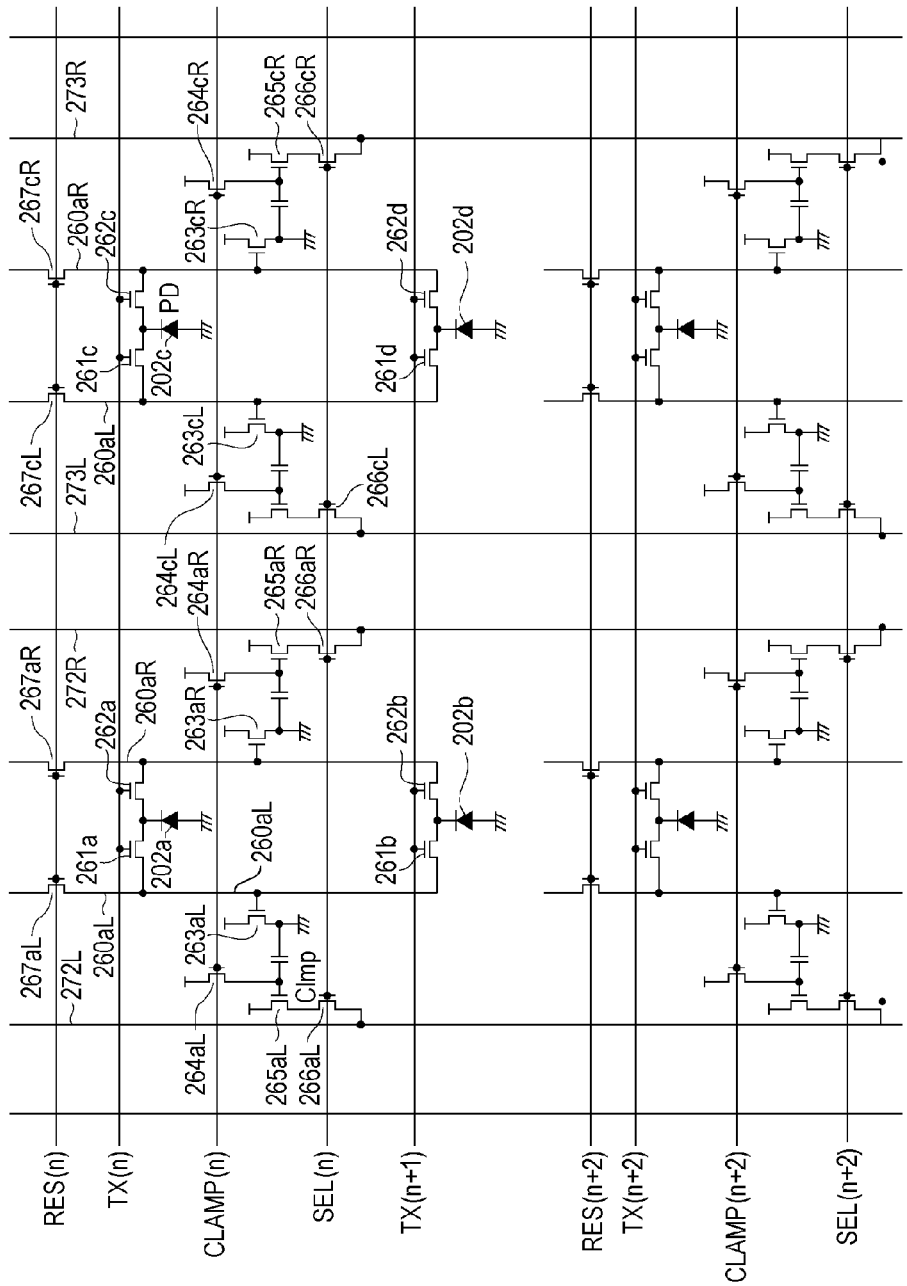
FIG. 14 is a diagram illustrating an equivalent circuit of an image pickup apparatus according to the exemplary embodiment.

FIG. 14 illustrates an equivalent circuit of an image pickup region 102 of an exemplary embodiment. Here, elements having the same functions as those of FIG. 3 are denoted with the same numerals. Detailed description of these elements is omitted. However, in FIG. 14, a plurality of elements having the same functions is arranged, they are differentiated with numerals followed by alphabets.

In the present exemplary embodiment, to perform phase difference AF on an imaging surface, one photoelectric conversion unit 202 includes two sub-regions. In one photoelectric conversion unit 202, an electric charge caused during a period from a first time to a second time is distributed to the two sub-regions. Then, the electric charge accumulated in each division region is transferred. Two signals based on the distributed electric charges in this way are read out. A gap of phase differences or focal points is detected based on a difference between the two signals. Note that, in the present exemplary embodiment, circuits for reading out two signals based on the electric charges of two division regions are discriminated by denoting with alphabets R and L.

In the present exemplary embodiment, one lens may be arranged to each photoelectric conversion unit 202. Further, a potential barrier against a signal electric charge may be formed between the two division regions of the photoelectric conversion unit 202. The height of the potential barrier is lower than a potential barrier between the photoelectric conversion unit 202 and another photoelectric conversion unit 202. With such a configuration, even in a case one of the two division regions of the photoelectric conversion unit 202 is saturated, it can be reduced to leak out the electric charge to other photoelectric conversion units. When the accumulated electric charge is an electron, the potential barrier can be configured from a P-type semiconductor region. Also, when the accumulated electric charge is a hole, the potential barrier can be configured from an N-type semiconductor region.

In the present exemplary embodiment, in a photoelectric conversion unit 202a, an electric charge accumulated in one of two division regions of the photoelectric conversion unit 202a from among electric charges caused during a period from a first time to a second time is transferred to an input node 260aR by a first transfer transistor 261a. In the photoelectric conversion unit 202a, an electric charge accumulated in the other of the two division regions of the photoelectric conversion unit 202a from among electric charges caused during a period from a first time to a second time is transferred to an input node 260aL by a second transfer transistor 262a. The transfer of the electric charge to the input node 260aR and the transfer of the electric charge to the input node 260aL may be performed in parallel.

Further, in a photoelectric conversion unit 202b, an electric charge accumulated in one of two division regions of the photoelectric conversion unit 202b from among electric charges caused during a period from a first time to a second time is transferred to an input node 260aR by a first transfer transistor 261b. In the photoelectric conversion unit 202b, an electric charge accumulated in the other of the two division regions of the photoelectric conversion unit 202b from among electric charges caused during a period from a first time to a second time is transferred to an input node 260aL by a second transfer transistor 262b.

Then, the electric charge transferred from the photoelectric conversion unit 202a and the electric charge transferred from the photoelectric conversion unit 202b are added in the input node 260aR. Further, the electric charge transferred from the photoelectric conversion unit 202a and the electric charge transferred from the photoelectric conversion unit 202b are added in the input node 260aL.

A signal obtained by the electric charges being added in the input node 260aR is output to an output line 272R. Also, a signal obtained by the electric charges being added in the input node 260aL is output to an output line 272L. In the present exemplary embodiment, the phase difference AF on the imaging surface is performed by applying predetermined processing to the signals output to the two output lines 272R and 272L.

Note that reading out of the signals to the output lines 272R and 272L is similar to those of the exemplary embodiment 1, and therefore, detailed description are omitted. Also, similarly to the exemplary embodiments 2 and 3, color filters of a plurality of colors may be arranged to a plurality of photoelectric conversion units. Further, a circuit configuration similar to that of the exemplary embodiments 5 and 6 may be employed.

As described above, the driving method of the present exemplary embodiment includes a distributing step of distributing and transferring electric charge caused during a period from a first time to a second time in each photoelectric conversion unit. Then, transferred electric charges are added in the electric charge reception unit. According to such a configuration, addition of signals with a simple configuration can be performed and the image quality can be improved since electric charges accumulated in the same period are added.

Further, in the driving method of the present exemplary embodiment, electric charges transferred from a plurality of photoelectric conversion units in both of two electric charge reception units. Further, a detecting step of detecting a phase difference using a signal obtained by the electric charges being added is included. According to such a configuration, electric charges from a plurality of photoelectric conversion units can be added, so that high sensitivity can be obtained even in a case where an object is dark. That is, even in a case where an object is dark, highly precise detection of a phase difference can be performed.

Exemplary Embodiment 9

Figure 15:
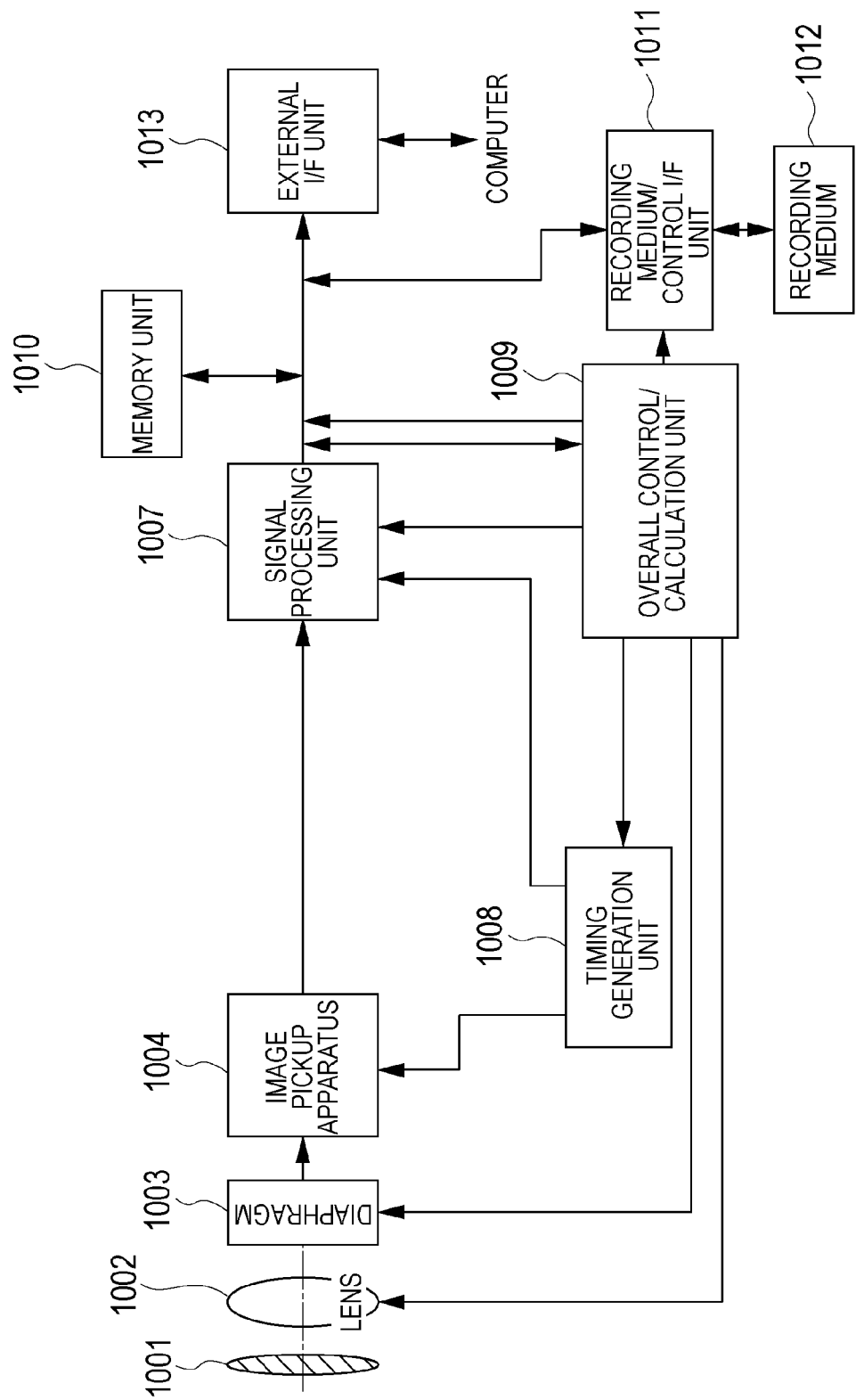
FIG. 15 is a block diagram of an image pickup system according to the exemplary embodiment of the present invention.

An exemplary embodiment of a method of driving an image pickup system will be described. Examples of the image pickup system include a digital still camera, a digital camcorder, a copier, a fax machine, a mobile phone, a carmounted camera, and a satellite. FIG. 15 illustrates a block diagram of a digital still camera as an example of the image pickup system.

FIG. 15 illustrates a barrier 1001 that protects a lens, a lens 1002 that images an optical image of an object to an image pickup apparatus 1004, and a diaphragm 1003 that adjusts an amount of light having passed through the lens 1002. The image pickup apparatus 1004 described in the above exemplary embodiments converts the optical image imaged by the lens 1002 into image data. Here, an AD conversion unit is formed on a semiconductor substrate of the image pickup apparatus 1004. A signal processing unit 1007 compresses imaged data output from the image pickup apparatus 1004 and various types of correction and data. Further, in FIG. 15, a timing generation unit 1008 outputs various timing signals to the image pickup apparatus 1004 and the signal processing unit 1007 and an overall control unit 1009 controls the whole digital still camera. A frame memory unit 1010 temporarily stores image data, an interface unit 1011 performs recording/reading out to a recording medium, and a detachably mounted recording medium 1012, such as a semiconductor memory, records/reads out imaged data. Further, an interface unit 1013 communicates with an external computer, and the like. Here, the timing signal and the like may be input from external image pickup system, and the image pickup system includes at least the image pickup apparatus 1004 and the signal processing unit 1007 that processes an imaged signal output from the image pickup apparatus 1004.

In the present exemplary embodiment, a configuration has been described in which the image pickup apparatus 1004 and the AD conversion unit are formed on the same semiconductor substrate. However, the image pickup apparatus 1004 and the AD conversion unit may be provided on separate semiconductor substrates. Further, the image pickup apparatus 1004 and the signal processing unit 1007 may be formed on the same substrate.

In the present exemplary embodiment, the image pickup apparatus 1004 is driven by any of the driving methods of the exemplary embodiments 1 to 8. In this way, any of the driving method of the exemplary embodiments 1 to 8 can be applied to an image pickup system. By applying the driving methods of the present exemplary embodiments to an image pickup system, the image quality of the image pickup system is improved and the image pickup system can be downsized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-157551, filed Jul. 13, 2012, which is hereby incorporated by reference herein in its entirety.

What is claimed is:

1. A method of driving an image pickup apparatus including a plurality of photoelectric conversion units, the method comprising:
   a generating step of generating electric charges in the plurality of photoelectric conversion units during a period from a first time to a second time; and
   a transferring step of transferring electric charges of one of the plurality of photoelectric conversion units generated in the generating step into a plurality of electric charge reception units in parallel,
   wherein electric charges transferred from different photoelectric conversion units in the transferring step are added in at least one of the plurality of electric charge reception units, by performing the transferring step for each of the plurality of photoelectric conversion units,
   the image pickup apparatus includes a plurality of transfer transistors arranged respectively in electric paths between one of the plurality of photoelectric conversion units and the plurality of electric charge reception units, each of the plurality of transfer transistors being directly connected to the one of the plurality of the photoelectric conversion units,
   each of the plurality of transfer transistors transfers an electric charge directly from the one of the plurality of photoelectric conversion units to a corresponding electric charge reception unit among the plurality of electric charge reception units, and the transferring step is performed by turning on the plurality of transfer transistors in parallel,
   wherein moving average processing is performed by adding electric charges transferred from different photoelectric conversion units in each of the plurality of electric charge reception units.

2. The method according to claim 1, wherein supplementary processing is performed using a plurality of signals obtained by the moving average processing.

3. The method according to claim 1, further comprising:
   an adding step of adding, in each of the plurality of electric charge reception units, electric charges transferred from different photoelectric conversion units, and
   an outputting step of outputting a plurality of signals based on the electric charges added in each of the plurality of electric charge reception units,
   wherein a pitch of the plurality of photoelectric conversion units along a first direction and a pitch of signal median points of the plurality of signals along the first direction are equal.

4. The method according to claim 3, wherein a position of the signal median point of the plurality of signals is a midpoint of median points of the plurality of photoelectric conversion units.

5. The method according to claim 3, wherein supplementary processing is performed using the plurality of signals.

6. The method according to claim 1, further comprising:
   an adding step of adding, in each of the plurality of electric charge reception units, electric charges transferred from different photoelectric conversion units, and
   an outputting step of outputting a plurality of signals based on the electric charges added in each of the plurality of electric charge reception units,
   wherein a pitch of the plurality of photoelectric conversion units along a first direction and a sampling pitch of the plurality of signals along the first direction are equal.

7. The method according to claim 6, wherein supplementary processing is performed using the plurality of signals.

8. The method according to claim 1, wherein
   the plurality of electric charge reception units includes at least a first electric charge reception unit and a second electric charge reception unit,
   electric charges transferred from different photoelectric conversion units are added in each of the first and second electric charge reception units, and
   phase difference detection is performed using a signal based on the electric charges added in the first electric charge reception unit and a signal based on the electric charges added in the second electric charge reception unit.

9. The method according to claim 8, wherein an electric charge of a first photoelectric conversion unit among the plurality of photoelectric conversion units is transferred to the first electric charge reception unit and the second electric charge reception unit in parallel, and an electric charge of a second photoelectric conversion unit among the plurality of photoelectric conversion units to the first electric charge reception unit and the second electric charge reception unit in parallel.

10. The method according to claim 1, wherein the second time is a time at which the plurality of transfer transistors is turned ON.

11. The method according to claim 1, wherein each of the plurality of electric charge reception units includes at least one floating diffusion region.

12. The method according to claim 11, wherein
color filters of a plurality of colors are arranged to the plurality of photoelectric conversion units,
each of the plurality of electric charge reception units includes a plurality of the floating diffusion regions, and
electric charges from a plurality of photoelectric conversion units to which color filters of the same color are arranged are added.

13. The method according to claim 1, wherein one electric charge reception unit different from the at least one of the plurality of electric charge reception units is a discharge node of an electric charge with respect to at least one photoelectric conversion unit among the plurality of photoelectric conversion units.

14. The method according to claim 13, wherein an electric charge of a photoelectric conversion unit arranged at an outer periphery of an image pickup region among the plurality of photoelectric conversion units is discharged to the discharge node.

15. The method according to claim 1, wherein the image pickup apparatus includes:
a first mode where the transferring step is performed; and
a second mode where performed is a second transferring step of transferring an electric charge from each of the plurality of photoelectric conversion units to only one electric charge reception unit.

16. The method according to claim 1, further comprising:
an exposure step of performing an exposure,
wherein the first time is a start time of one exposure period in each of the plurality of photoelectric conversion units, and the second time is an end time of the one exposure period in each of the plurality of photoelectric conversion units.

17. The method according to claim 16, wherein the exposure is performed by a global shutter operation.

18. The method according to claim 16, wherein the exposure is performed by a rolling shutter operation.

19. The method according to claim 1, wherein the image pickup apparatus includes:
a plurality of amplification transistors configured to output a plurality of signals based on electric charges added respectively in the plurality of electric charge reception units;
an output line, the plurality of signals from the plurality of amplification transistors being output to the output line; and
a plurality of holding capacitors, each arranged in an electric path between each of the plurality of amplification transistors and the output line, and
the method further comprises an outputting step of sequentially outputting a plurality of signals held in the plurality of holding capacitors to the output line.

20. A method of driving an image pickup apparatus including a plurality of photoelectric conversion units, the method comprising:

a generating step of generating electric charges in the plurality of photoelectric conversion units during a period from a first time to a second time; and
a transferring step of transferring electric charges of one of the plurality of photoelectric conversion units generated in the generating step into a plurality of floating diffusion regions in parallel,
wherein electric charges transferred from different photoelectric conversion units in the transferring step are added in at least one of the plurality of floating diffusion regions, by performing the transferring step for each of the plurality of photoelectric conversion units,
the image pickup apparatus includes a plurality of transfer transistors arranged respectively in electric paths between one of the plurality of the photoelectric conversion units and the plurality of floating diffusion regions, each of the plurality of transfer transistors being directly connected to the one of the plurality of the photoelectric conversion units,
each of the plurality of transfer transistors transfers an electric charge directly from the one of the plurality of photoelectric conversion units to a corresponding floating diffusion regions among the plurality of floating diffusion regions, and
the transferring step is performed by turning on the plurality of transfer transistors in parallel,
wherein
electric charges transferred from a first group of the photoelectric conversion units are added in a first one of the plurality of floating diffusion regions,
electric charges transferred from a second group of the photoelectric conversion units are added in a second one of the plurality of floating diffusion regions, and
the first group and the second group are different from each other but include at least one common photoelectric conversion unit.

21. A method of driving an image pickup system including an image pickup apparatus including a plurality of photoelectric conversion units and a signal processing apparatus configured to process a signal output from the image pickup apparatus, the method comprising:
a generating step of generating electric charges in the plurality of photoelectric conversion units during a period from a first time to a second time; and
a transferring step of transferring electric charges of one of the plurality of photoelectric conversion units generated in the generating step into a plurality of electric charge reception units in parallel,
wherein electric charges transferred from different photoelectric conversion units in the transferring step are added in at least one of the plurality of electric charge reception units, by performing the transferring step for each of the plurality of photoelectric conversion units,
the image pickup apparatus includes a plurality of transfer transistors arranged respectively in electric paths between one of the plurality of photoelectric conversion units and the plurality of electric charge reception units, each of the plurality of transfer transistors being directly connected to the one of the plurality of the photoelectric conversion units,
each of the plurality of transfer transistors transfers an electric charge from the one of the plurality of photoelectric conversion units to a corresponding electric charge reception unit among the plurality of electric charge reception units, and
the transferring step is performed by turning on the plurality of transfer transistors in parallel, wherein
electric charges transferred from a first group of the photoelectric conversion units are added in a first one of the plurality of electric charge reception units,
electric charges transferred from a second group of the photoelectric conversion units are added in a second one of the plurality of electric charge reception units, and
the first group and the second group are different from each other but include at least one common photoelectric conversion unit.

22. A method of driving an image pickup apparatus including a plurality of photoelectric conversion units, the method comprising:
a generating step of generating electric charges in the plurality of photoelectric conversion units during a period from a first time to a second time; and
a transferring step of transferring electric charges of one of the plurality of photoelectric conversion units generated in the generating step into a plurality of electric charge reception units in parallel,
wherein electric charges transferred from different photoelectric conversion units in the transferring step are added in at least one of the plurality of electric charge reception units, by performing the transferring step for each of the plurality of photoelectric conversion units,
the image pickup apparatus includes a plurality of transfer transistors arranged respectively in electric paths between one of the plurality of photoelectric conversion units and the plurality of electric charge reception units, each of the plurality of transfer transistors being directly connected to the one of the plurality of the photoelectric conversion units,
each of the plurality of transfer transistors transfers an electric charge directly from the one of the plurality of photoelectric conversion units to a corresponding electric charge reception unit among the plurality of electric charge reception units, and the transferring step is performed by turning on the plurality of transfer transistors in parallel,
wherein
electric charges transferred from a first group of the photoelectric conversion units are added in a first one of the plurality of electric charge reception units,
electric charges transferred from a second group of the photoelectric conversion units are added in a second one of the plurality of electric charge reception units, and
the first group and the second group are different from each other but include at least one common photoelectric conversion unit.

\* \* \* \* \*